(12) United States Patent
Hollars

(10) Patent No.: US 9,238,574 B2
(45) Date of Patent: Jan. 19, 2016

(54) BEVERAGE DISPENSER WITH TWO-STAGE REGULATOR

(75) Inventor: Anthony S. Hollars, Tucson, AZ (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 12/968,018

(22) Filed: Dec. 14, 2010

(65) Prior Publication Data

US 2012/0145750 A1    Jun. 14, 2012

(51) Int. Cl.
*B67D 1/00* (2006.01)
*B67D 1/04* (2006.01)

(52) U.S. Cl.
CPC ............ *B67D 1/0412* (2013.01); *B67D 1/0418* (2013.01)

(58) Field of Classification Search
CPC ............................ B67D 1/0412; B67D 1/0418
USPC .............. 222/399, 394, 396, 400.7, 464.1, 61
See application file for complete search history.

(56) References Cited

U.S. PATENT DOCUMENTS

| | | | | |
|---|---|---|---|---|
| 1,234,939 | A | * | 7/1917 | Schmid ............................ 222/61 |
| 2,388,026 | A | * | 10/1945 | Ward ........................ 137/630.22 |
| 3,232,485 | A | | 2/1966 | Wilson |
| 3,291,343 | A | * | 12/1966 | Tracy et al. ...................... 222/61 |
| 3,317,089 | A | * | 5/1967 | Kopezynski ................... 222/183 |
| 3,327,899 | A | * | 6/1967 | Reynolds et al. ................... 222/5 |
| 3,558,010 | A | * | 1/1971 | Zenger et al. ...................... 222/5 |
| 3,679,104 | A | * | 7/1972 | Giroud ........................... 222/396 |
| 3,976,221 | A | * | 8/1976 | Martin et al. .................... 222/61 |
| 5,022,565 | A | * | 6/1991 | Sturman et al. ............... 222/396 |
| 5,443,186 | A | * | 8/1995 | Grill .............................. 222/396 |
| 5,544,670 | A | * | 8/1996 | Phillips et al. ................ 137/224 |
| 5,894,869 | A | * | 4/1999 | Mussack .......................... 141/19 |
| 2009/0071548 | A1 | * | 3/2009 | Patterson et al. ............. 137/497 |
| 2011/0049193 | A1 | * | 3/2011 | Muller Kubold et al. .... 222/399 |

FOREIGN PATENT DOCUMENTS

| | | |
|---|---|---|
| DE | 1272153 | 7/1968 |
| WO | WO2005058744 | 6/2005 |

OTHER PUBLICATIONS

PCT/US2011/064483—International Search Report and Written Opinion dated Jul. 18, 2012.

* cited by examiner

*Primary Examiner* — Paul R Durand
*Assistant Examiner* — Charles P Cheyney
(74) *Attorney, Agent, or Firm* — Dale F. Regelman; Quarles & Brady LLP

(57) ABSTRACT

A portable beverage dispensing apparatus including a spout assembly, a handle assembly pivotally attached to the spout assembly, and a first and second pressure regulator disposed within the handle assembly.

15 Claims, 17 Drawing Sheets

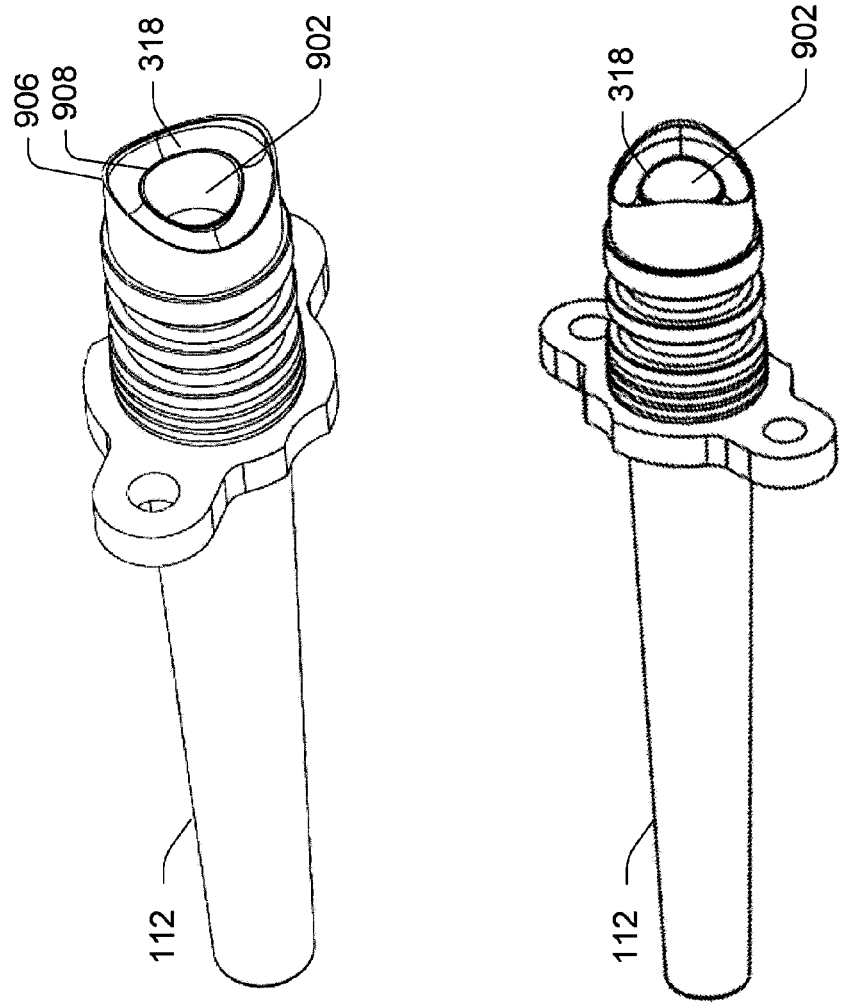

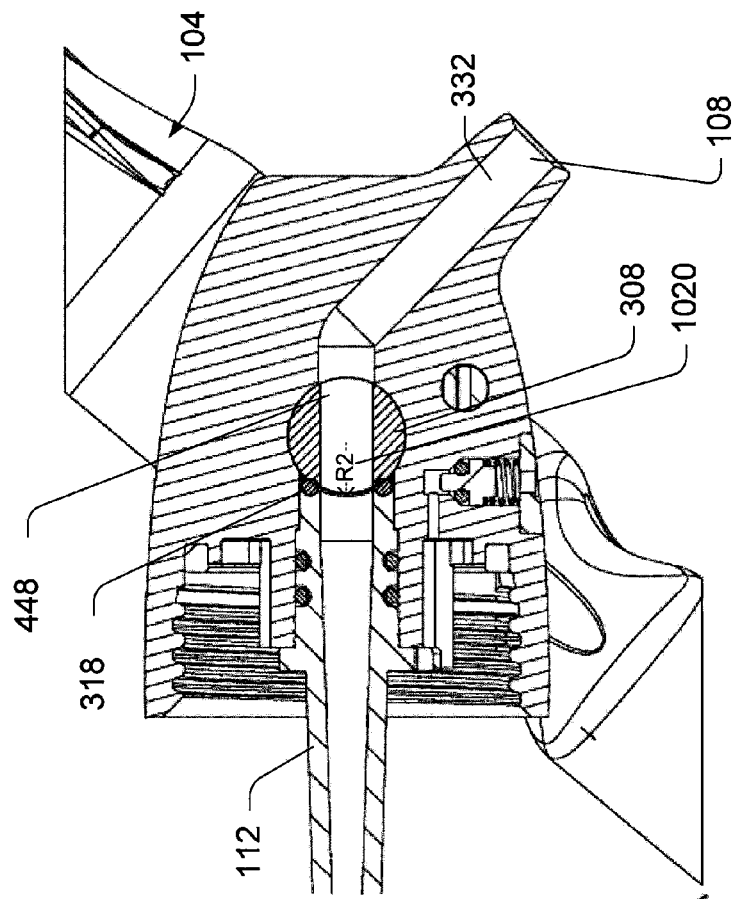
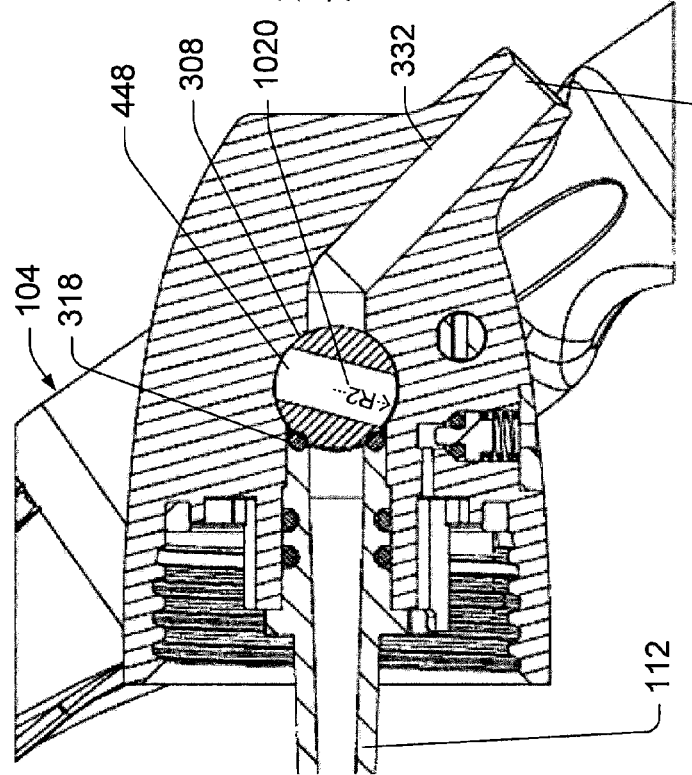
Fig. 10(a)
Fig. 10(b)

BEVERAGE DISPENSER WITH TWO-STAGE REGULATOR

FIELD

The invention relates to an apparatus and method for dispensing a beverage from a reservoir and more particularly to an apparatus and method that provides pressurized gas at or near an equilibrium pressure of gas in the beverage.

BACKGROUND

Many beverages, such as beer and soda, are often stored in a container, or keg. In the case of carbonated beverages, the keg is capable of withstanding elevated internal pressures to retain a level of dissolved carbon dioxide in the beverage during storage as well as providing a means to drive the beverage out of the keg while serving. The beverage in a keg is generally served by applying pressure, from an external source, to the contents of the keg, thereby pressurizing the keg and forcing the beverage out through a spout. The pressure is often supplied in the form of compressed gas injected into the keg. The compressed gas can be supplied manually from a hand-operated pump, in which case the gas is generally comprised of ambient air. Or, the compressed gas can be supplied by a pressurized tank containing an inert gas, such as carbon dioxide or nitrogen.

In the case of carbonated beverages, which contain dissolved carbon dioxide, carbon dioxide gas is frequently used to pressurize the keg for the purpose of serving the beverage. In addition, the introduced carbon dioxide maintains the dissolved level of carbon dioxide in the beverage, thereby preventing the beverage from going "flat."

Over-pressurizing the keg can lead to a number of undesirable results. First, a keg may burst when exposed to an internal pressure exceeding design limits. This can result is spillage of the contained beverage and potential injury to nearly persons and/or property. Secondly, over-pressurization will over-carbonate the beverage, potentially altering the character and taste of the beverage. Finally, over pressurization can result is excessive foaming of the dispensed beverage.

Some common pressurization methods, such as a hand-driven pump, cause the pressure in the keg to cycle above and below the optimum pressure necessary to serve the beverage and to maintain the proper level of dissolved carbon dioxide in the beverage.

Pressurization methods that use a single stage pressure regulator combined with a high pressure gas source either cannot (a) provide the relatively low pressure necessary to maintain the proper level of dissolved carbon dioxide in the beverage or (b) controllably maintain such a level with sufficient accuracy. For example, compressed gas sources generally provide pressure at about 850 psi in the case of carbon dioxide. The pressure to maintain the proper level of dissolved carbon dioxide for some beverages is 12 psi. The pressure of the gas source is thus roughly 70 times the desired serving pressure. Single stage pressure regulators either cannot achieve the 70 times reduction in pressure or cannot achieve the desired serving pressure with any accuracy or consistency.

SUMMARY

A portable beverage dispensing apparatus is presented. The portable beverage dispensing apparatus comprises a spout assembly and a handle assembly. The handle assembly is pivotally attached to the spout assembly. The portable beverage dispensing apparatus further comprises a first pressure regulator. The first pressure regulator is disposed within the handle assembly. The portable beverage dispensing apparatus further comprises a second pressure regulator. The second pressure regulator is in fluid communication with the first pressure regulator. The second pressure regulator is disposed within the handle assembly.

A method for dispensing a beverage from a reservoir is also presented. The method provides Applicant's dispensing apparatus and releasably attaches that dispensing apparatus to a beverage reservoir comprising a beverage that has an equilibrium carbon dioxide pressure. The method fills a head space within the reservoir with carbon dioxide to the beverage equilibrium pressure.

BRIEF DESCRIPTION OF THE DRAWINGS

FIGS. 9(a) and 9(b) depict a curved O-ring used in the beverage dispenser of FIG. 1A;

FIGS. 10(a) and 10(b) are cross sectional views of the beverage dispenser of FIG. 2 along 2-2 showing the beverage dispenser in the "open" and "closed" positions;

DETAILED DESCRIPTION

This invention is described in preferred embodiments in the following description with reference to the FIGs., in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 12:
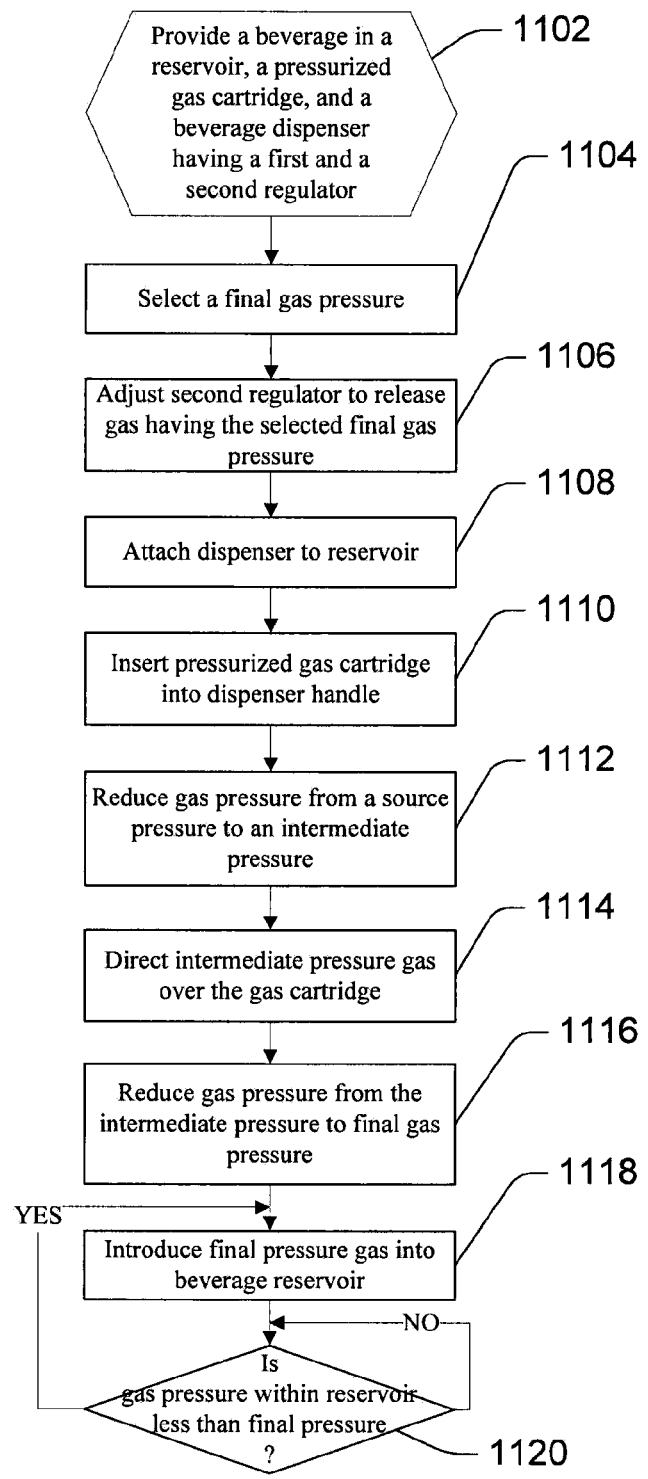
FIG. 12 is a flowchart describing one embodiment of a method to use Applicant's beverage dispenser.

The schematic flow chart diagrams included are generally set forth as logical flow-chart diagrams (e.g., FIG. 12). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIG. 12). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Applicant's apparatus and method are described herein in the context of a mini beer keg dispenser. This description should not be taken as limiting. Applicant's apparatus and method can be used to dispense any carbonated beverage.

Traditional beer kegs are large, require a means of refrigeration, and require relatively expensive additional hardware, such as a carbon dioxide tank and a tap, in order to dispense the contained beverage. The introduction of small kegs (i.e., "mini-kegs"), such as those with a capacity of 5 liters or ½ gallon, enables kegs to be used in a greater number of circumstances. For example, a mini-keg is small enough to be placed in nearly any size refrigerator. Since mini-kegs, however, are generally small, the dispenser should also be small and self contained so as to not require substantially more space for cooling when in preparation for serving.

A compact and portable apparatus and method for providing carbon dioxide at a controlled, consistent pressure, and equilibrium pressure, for the purpose of dispensing beer from a mini keg is presented.

In different embodiments, Applicant's apparatus and a method dispense a beverage from a reservoir using pressurized gas and a two-stage regulator. For the purposes of this Application, the terms keg, container, and reservoir are used interchangeably.

Figure 1A:
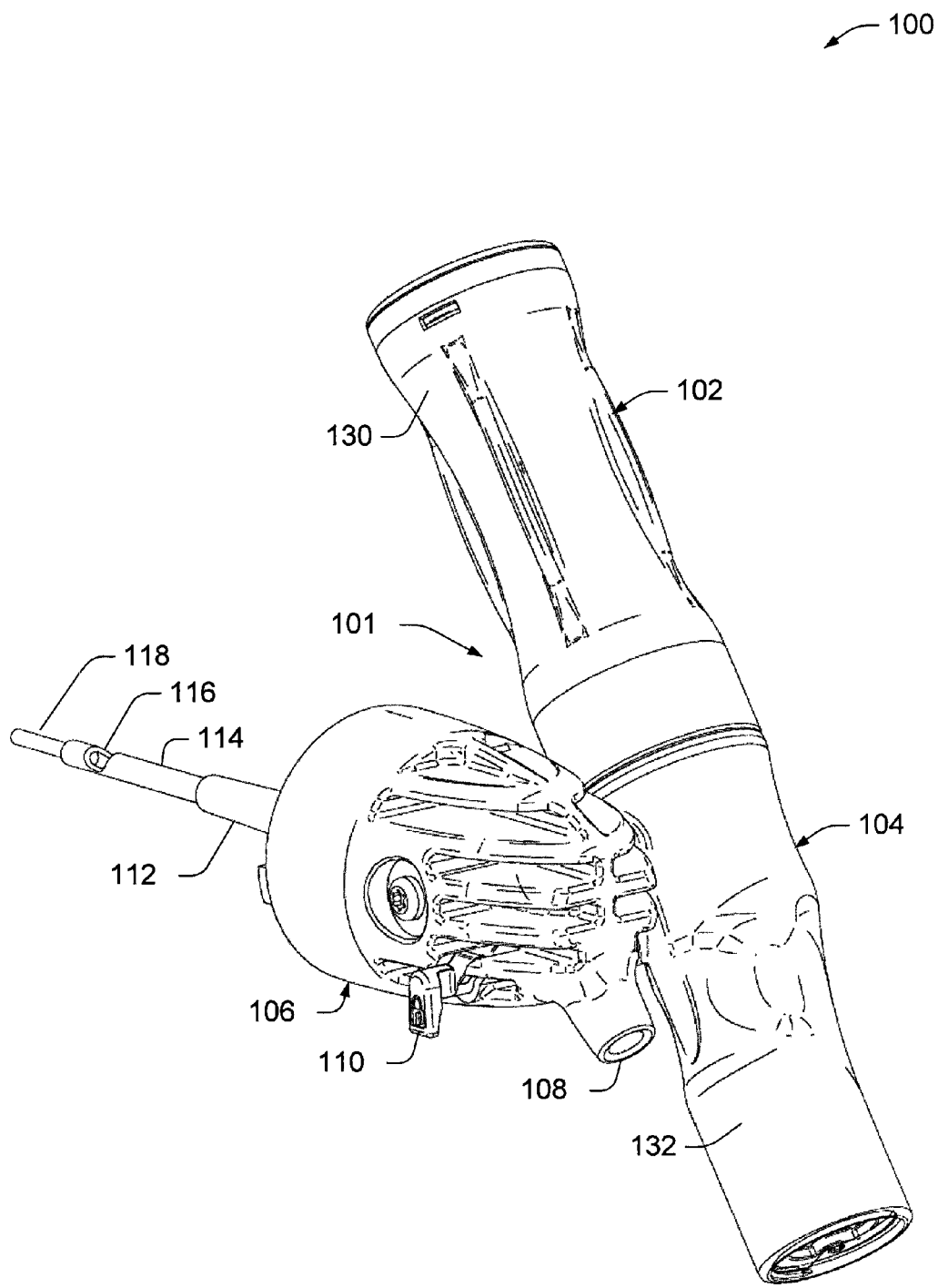
FIG. 1A is a perspective drawing depicting one embodiment of Applicant's beverage dispenser.
Figure 1B:
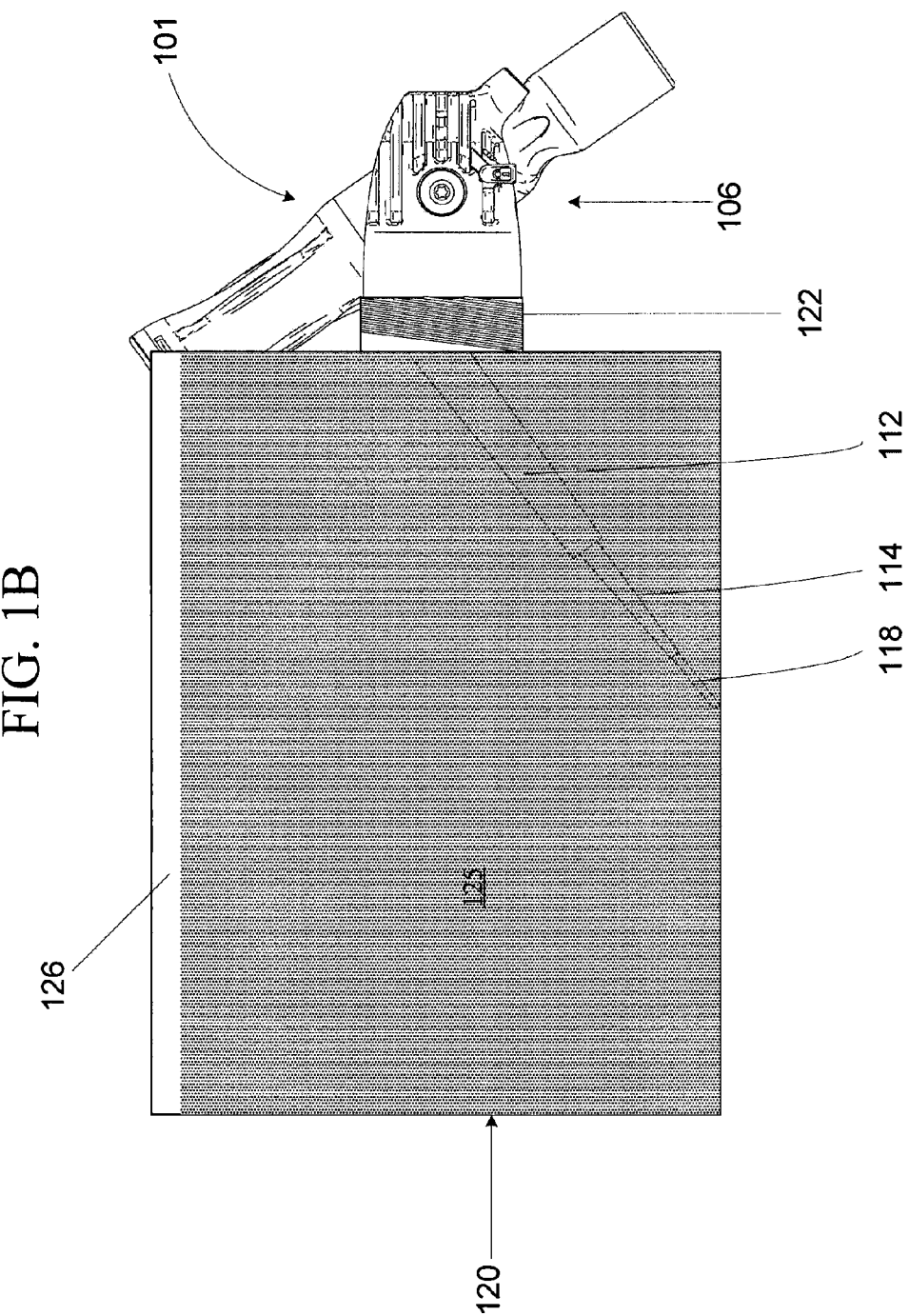
FIG. 1B shows the beverage dispenser of FIG. 1A in combination with a beverage container and a beverage, wherein the dispenser is disposed in a closed configuration.
Figure 1C:
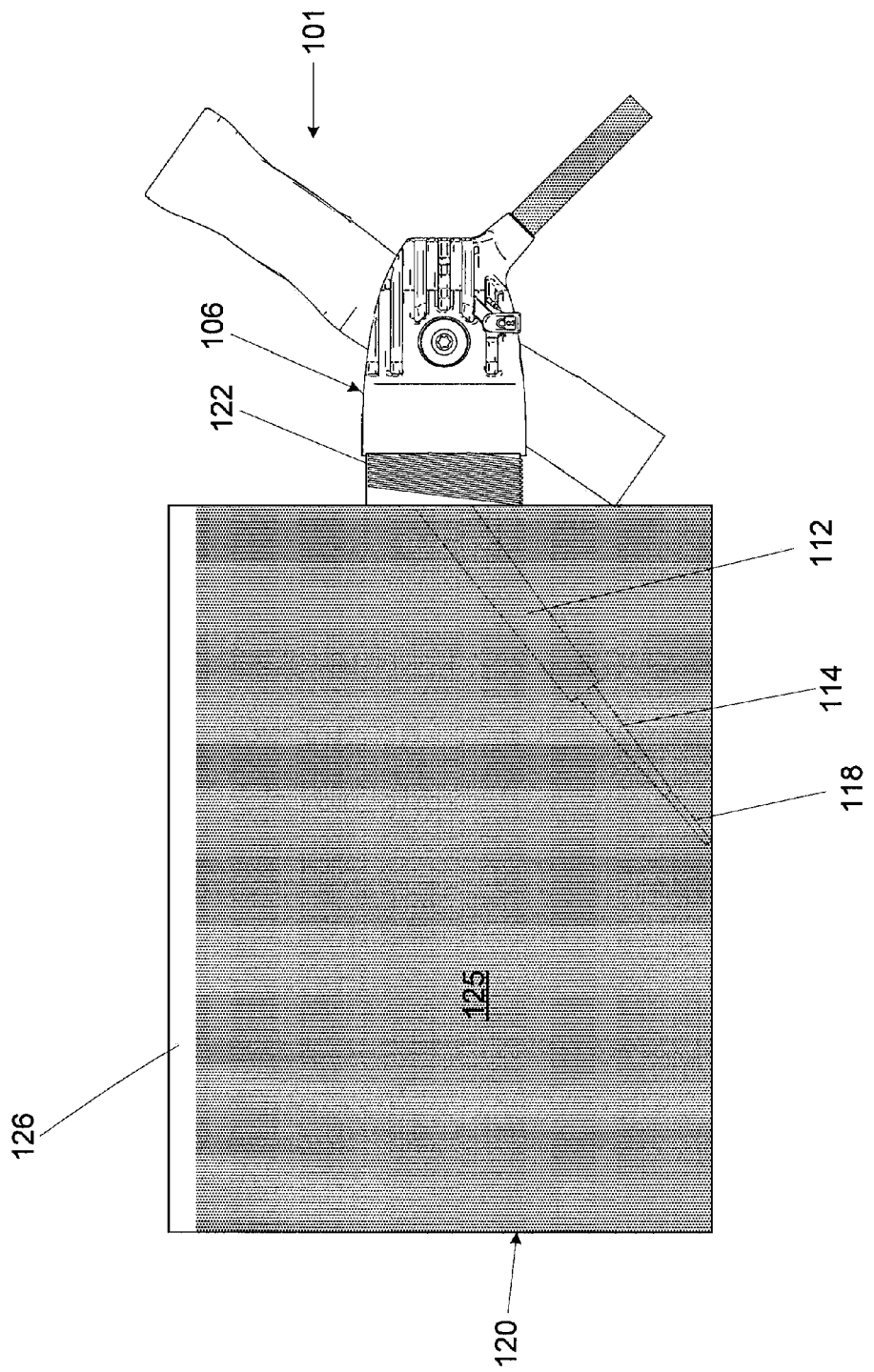
FIG. 1C shows the beverage dispenser of FIG. 1A in combination with a beverage container and a beverage, wherein the dispenser is disposed in an open configuration.

Referring to FIGS. 1A, 1B, and 1C, Applicant's beverage dispenser 100 includes a handle assembly 101 and a spout assembly 106. Handle assembly 101 comprises an upper handle portion 102 and a lower handle portion 104. The upper handle portion 102 includes an upper housing 130. In one embodiment, the upper housing 130 is molded from a plastic material, such as an engineering thermoplastic. In one embodiment, the upper housing 130 is manufactured from metal, such as aluminum. The lower handle portion 104 includes a lower housing 132. In one embodiment, the lower housing 130 is molded from a plastic material, such as an engineering thermoplastic. In one embodiment, the lower housing 130 is manufactured from metal, such as aluminum. The upper and lower handle assemblies 102 and 104 house a pressurized gas cartridge (not visible in FIG. 1). The spout assembly 106 is rotationally attached to the lower handle portion 104. The spout assembly 106 includes an outlet port 108, where a beverage can be dispensed from beverage dispenser 100. The flow of beverage to the output port is controlled by the rotational position of the handle assembly 101 about the spout assembly 106.

FIGS. 1B and 1C illustrate dispenser 100 releasably attached to beverage container 120, wherein container 120 comprises a threaded connector 122. In the illustrated embodiments of FIGS. 1B and 1C, container 120 contains a beverage 125.

The relative position of handle assembly 101 to the spout assembly 106 in FIGS. 1A and 1B depict beverage dispenser 100 in a "closed" configuration wherein a beverage 125 is not dispensed from container 120 through outlet port 108. FIG. 1C depicts beverage dispenser 100 in an "open" configuration wherein a beverage 125 is dispensed from container 120 through outlet port 108.

The spout assembly 106 includes a safety lock 110. The safety lock 110 secures the lower handle portion 104 in the "closed" configuration of FIGS. 1A and 1B. When the handle assembly 101 is in the "closed" position of FIGS. 1A and 1B, the safety lock 110 may be moved inwardly to secure the handle assembly 101 to spout assembly 106. With the safety lock 110 engaged, undesired activation of the beverage dispenser 100 can be avoided, such as during transportation or during storage.

FIGS. 1B and 1C show spout assembly 106 releasably attached to a beverage container 120 by a threaded connector. The beverage container may be a metal or plastic keg. In one embodiment, the container is a 5.7 liter/1.5 gallon polyethylene terephthalate (PET) beer keg.

A tubular diffuser member 112 is attached to and extends outwardly from spout assembly 106. A tubular pickup member 114 is attached to a distal end of tubular diffuser member 112, and extends outwardly therefrom. In the illustrated embodiment of FIG. 1A, tubular pickup member 114 is formed to include an inlet port 116. The length of tubular pickup member 114 can be adjusted based upon the dimensions of beverage container 120. A solid member 118 is connected to a distal end of the tubular pickup member 114. In one embodiment, the tubular diffuser member 112 is constructed of rigid, food grade plastic. In one embodiment, the tubular pickup member 114 is constructed of flexible FDA approved nylon tubing and is 12 (twelve) inches long. In one embodiment, the solid member 118 is stainless steel round stock.

When spout assembly 106 is attached to a beverage container, such as for example and without limitation container 120, diffuser 112, tubular pickup member 114, and the solid member 118, extend into beverage container 120. Gravity pulls solid member 118 downwardly, and therefore, solid member 118 positions inlet port 116 of the tubular pickup member 114 adjacent a bottom of beverage container 120 thereby enabling Applicant's dispenser to discharge essentially the entire contents of beverage container 120.

Moving handle assembly 101 from the closed orientation of FIG. 1C to the open configuration of FIGS. 1A and 1B, beverage 125 enters inlet port 116, travels through tubular pickup member 114 and tubular diffuser member 112, through spout assembly 106, and exits from outlet port 108.

Figure 2:
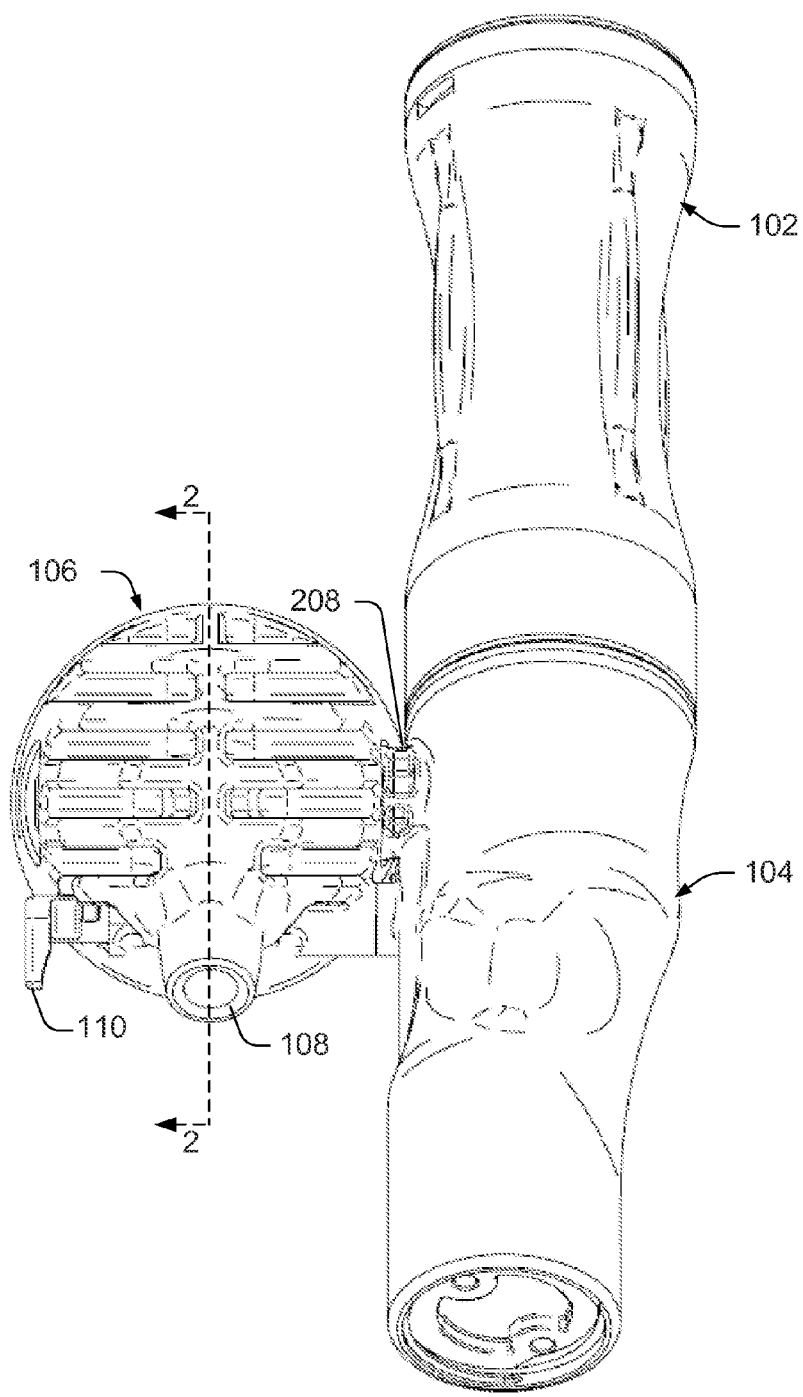
FIG. 2 illustrates a front view of one embodiment of Applicant's beverage dispenser.
Figure 3:
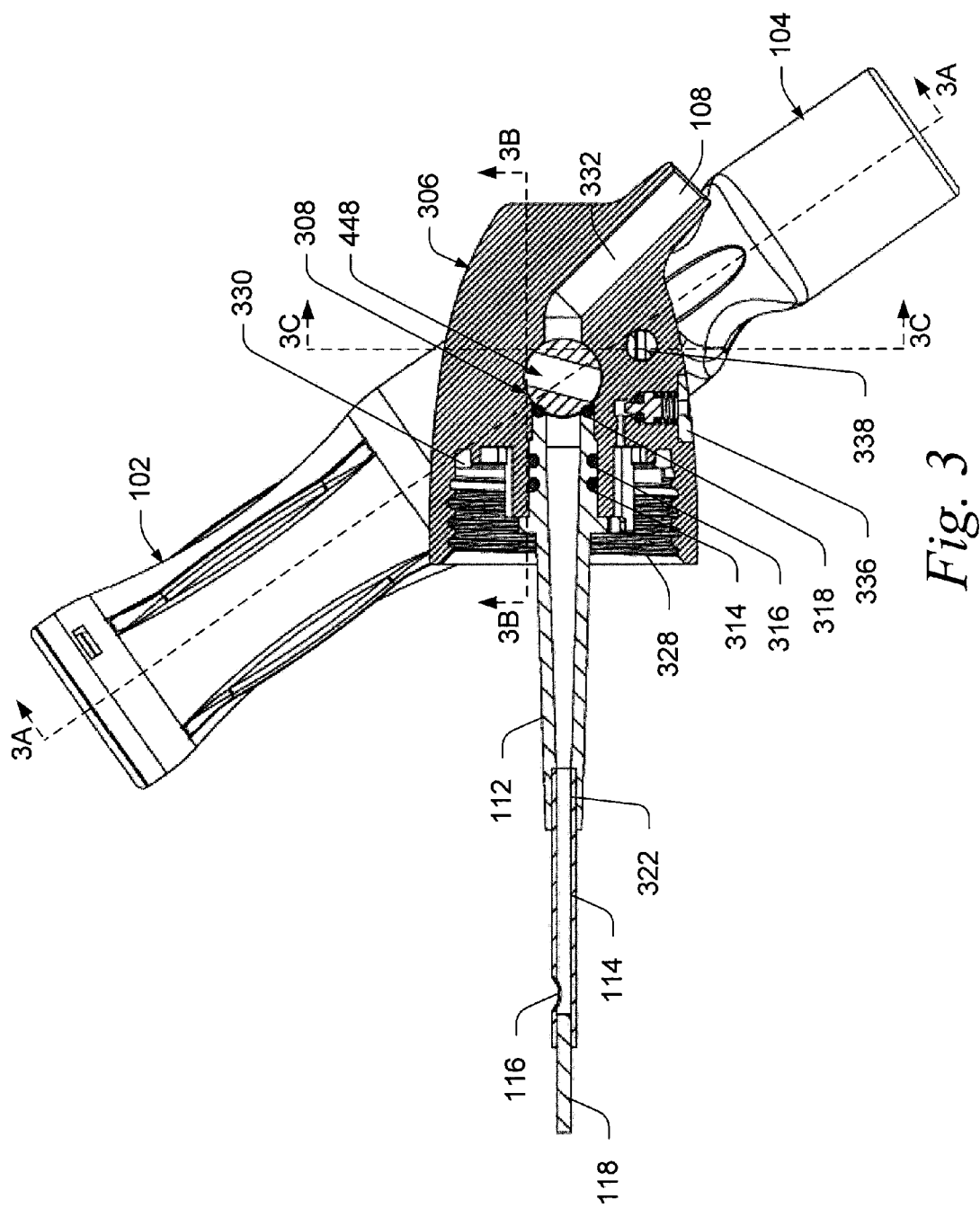
FIG. 3 is a cross sectional view of the beverage dispenser of FIG. 2 along 2-2.

Referring to FIGS. 2 and 3 spout assembly 106 is rotationally attached to the lower handle portion at attachment point 208. In one embodiment, the lower handle portion 104 can rotate about 75° around pivot point 208. FIG. 3 illustrates a cross sectional view of the spout assembly 106 along 2-2 of FIG. 2. The upper handle portion 102 is secured to the lower handle portion 104. The upper and lower handle assemblies 102 and 104 house a pressurized gas cartridge and a two-stage regulator, wherein the regulator reduces high pressure gas released from the gas cartridge to a lower, precise, and consistent pressure gas which is introduced into container 120 via spout assembly 106.

Spout assembly 106 is rotationally attached to a stem 308. The stem 308 extends outwardly from, and is attached to, the lower handle portion 104. The stem 308 is formed to include a stem channel 448. The orientation of stem channel 448 controls the flow of the beverage through spout assembly 106.

The spout assembly 106 is formed to include a threaded aperture 328 for attaching to a beverage container, such as and without limitation container 120 (FIGS. 1A, 1B). A beverage container, such as container 120, can be threadedly coupled to threaded aperture 328 such that a distal end of connector 122 contacts sealing O-ring 330. The sealing O-ring 330 creates a liquid and pressure seal between the spout assembly 306 and beverage container 120.

A diameter of the diffuser tube 112 smoothly decreases as a function of distance from spout assembly 106. As a carbonated beverage 125 flows through diffuser tube 112 the gradual increase in diameter facilitates laminar flow of beverage 125 through diffuser tube 112 without formation of bubbles or foaming while dispensing the carbonated beverage. In one embodiment, the tubular diffuser member 112 is constructed of rigid, food grade plastic.

O-rings 314 and 316 provide a liquid and pressure seal between the diffuser tube 112 and the spout assembly 306. O-ring 318 provides a liquid and pressure seal between the diffuser tube 112 and the stem 308.

Tubular pickup member 114 is attached to the diffuser tube 112. In one embodiment, tubular pickup member 114 is constructed of flexible, FDA approved nylon tubing. The tubular pickup member 114 extends into the diffuser tube 112 at connection point 322. The internal diameter of the tubular pickup member 114 is identical to the internal diameter of the diffuser tube 112 at the connection point 322.

Applicant has found that exposed edges and abrupt changes in diameter of flow channels result in formation of bubbles and foam when dispensing carbonated beverages. To eliminate such bubble and foam formation, dispenser 100 maintains an identical internal diameter between tubular pickup member 114 and diffuser tube 112 at connection point 322.

The tubular pickup member 114 is formed to include an inlet port 116. The length of tubular pickup member 114 can be adjusted based upon the dimensions of beverage container 120. In another embodiment, the length of the tubular pickup member 114 is adjusted so a portion of tubular pickup member 114 containing inlet port 116 is positioned adjacent to the bottom portion of container 120 when container 120 is disposed in the orientation of FIGS. 1B and 1C.

A weight 118 is attached to tubular pickup member 114. In one embodiment, the weight 118 is constructed from stainless steel round stock. In one embodiment, the weight 118 has a diameter that is larger than the internal diameter of tubular pickup member 114. The weight 118 is inserted into tubular pickup member 114, such that tubular pickup member 114 contracts around and securely holds the weight 118.

When the beverage dispenser 100 is attached to a beverage container 120, compressed gas from a high pressure gas cartridge housed in handle assembly 101, after two stages of pressure reduction, is released into beverage container 120 through a channel in the spout assembly 106. In one embodiment, the pressurized gas is carbon dioxide ($CO_2$), wherein the carbon dioxide exiting Applicant's two-stage regulator comprises a pressure that equals an equilibrium pressure of carbon dioxide in the headspace 126 of the container 120. Matching the pressure of the $CO_2$ released into container 120 with an equilibrium $CO_2$ pressure in head space 124 avoids over-carbonization of the contained beverage 125. In one embodiment, Applicant's two-stage regulator can be set to maintain a pressure in the beverage container 120 of between 8 to 18 pounds per square inch (psi) with an accuracy of +1-2 psi.

Rotating lower handle portion 101 so the stem channel 448 aligns with the diffuser tube 112, a pressure in head space 126 of beverage container 120 pushes the beverage 125 into the inlet port 116. The beverage 125 flows through tubular pickup member 114, through the diffuser tube 112, through the stem channel 448, through the spout channel 332, and outwardly from outlet port 108. As the beverage flows through the beverage dispenser 100, the matched diameter connection at point 322 between the tubular pickup member 114 and the diffuser tube 112 and the gradual increase in diameter along the length of the diffuser tube 112 toward the spout assembly 106, minimize the formation of undesired bubbles and excessive foam while dispensing carbonated beverages. In one embodiment, due to the controlled pressure in the beverage container from the two-stage regulator and the smooth path for the beverage through the beverage dispenser 300, beverage 125 flows from the inlet port 116 to the outlet port 108 with little or no turbulent flow.

As those skilled in the art will appreciate, in fluid mechanics a Reynolds number Re is a dimensionless number that gives a measure of the ratio of inertial forces to viscous forces. Reynolds numbers characterize different flow regimes, such as laminar or turbulent flow. Laminar flow occurs at low Reynolds numbers when viscous forces are dominant and the fluid flow is characterized by smooth, constant motion. On the other hand, turbulent flow occurs at high Reynolds numbers and is dominated by inertial forces, which tend to produce chaotic eddies, vortices and other flow instabilities. The occurrence of turbulent flow through the beverage dispenser 100 will generally result in excessive foam as the beverage exits outlet port 108. It is therefore desirable to minimize or eliminate turbulent flow in the beverage as it flows through the tubular pickup member 114, through the diffuser tube 112, through the stem channel 448, through the spout channel 332, and outwardly from outlet port 108.

In certain embodiments, beverage 125 flows through tubular pickup member 114, through the diffuser tube 112, through the stem channel 448, through the spout channel 332, and outwardly from outlet port 108, wherein that beverage never comprises a Reynolds number greater than 2,300. In certain embodiments, beverage 125 flows through tubular pickup member 114, through the diffuser tube 112, through the stem channel 448, through the spout channel 332, and outwardly from outlet port 108, wherein that beverage never comprises a Reynolds number greater than 4,000. In certain embodiments, beverage 125 flows through tubular pickup member 114, through the diffuser tube 112, through the stem channel 448, through the spout channel 332, and outwardly from outlet port 108, wherein that beverage never comprises a Reynolds number greater than 10,000. In certain embodiments, beverage 125 flows through tubular pickup member 114, through the diffuser tube 112, through the stem channel 448, through the spout channel 332, and outwardly from outlet port 108, wherein that beverage never comprises a Reynolds number greater than 50,000.

A relief valve 336 is incorporated into the spout assembly 306. The relief value 336 is in fluid communication with the interior of the beverage container. If the pressure inside the attached beverage container exceeds a specified level, the relief value 336 will open, thereby venting the contents of the container to the atmosphere. The relief value 336 is designed to avoid an explosion of the beverage container due to excessive pressure; therefore the relief value 336 is set to open at a pressure level below the design limit of the beverage container.

The safety lock channel 338 is configured to accept a safety lock. The safety lock is inserted into the safety lock channel 338 and locks the rotational position of the lower handle portion 104 about spout assembly 306 in the "closed" position (as shown in FIG. 3). In the "closed" position, the stem channel 448 is fully out of alignment with the diffuser tube 112, thereby preventing the beverage from flowing to the outlet port 108. With the safety lock engaged, undesired activation of the beverage dispenser 300 can be avoided, such as during transportation or during non-operable storage.

Figure 4A:
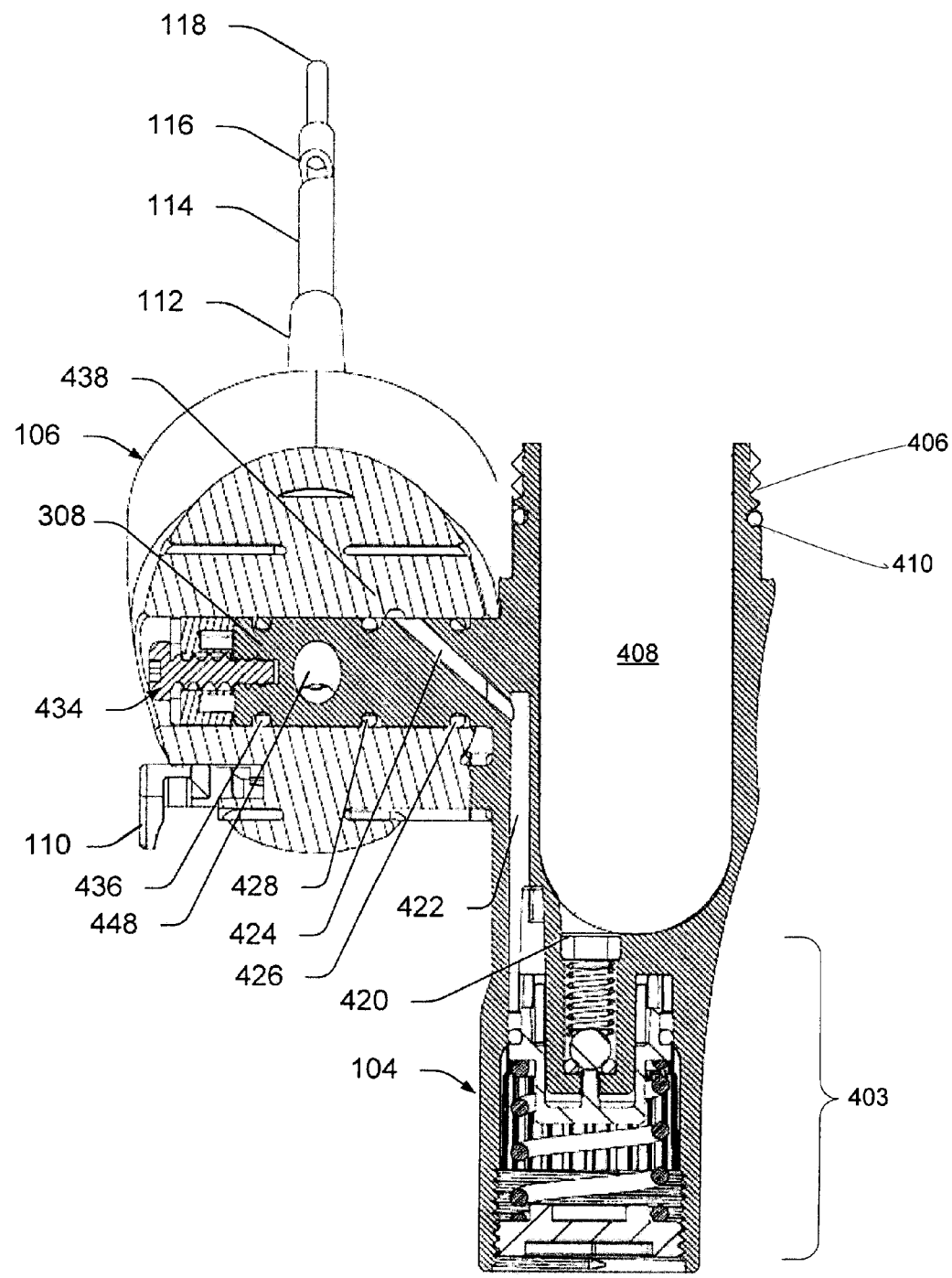
FIG. 4A is a cross sectional view of a sub-assembly of the beverage dispenser of FIG. 1A.

Referring to FIG. 4A, illustrates a cross section view taken along 3A-3A of FIG. 3. Lower handle portion 104 is formed to include an bore 408 extending inwardly from one end. A distal exterior surface partially defining bore 408 is formed to include a threaded element 406. An O-ring 410 is disposed adjacent to threaded element 406.

Figure 4B:
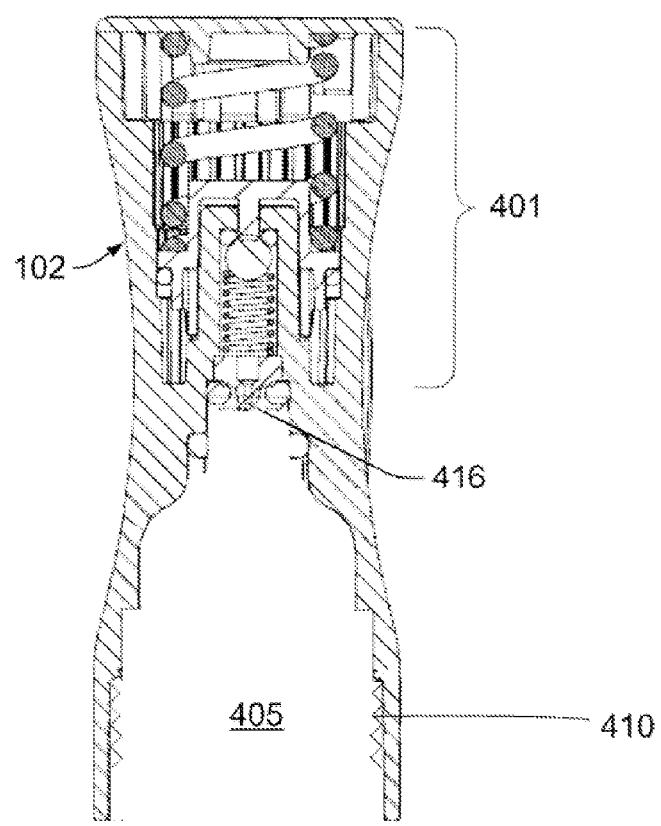
FIG. 4B is a cross-sectional view of an upper handle portion of the beverage dispenser of FIG. 1A.

Referring to FIG. 4B, upper handle portion is formed to include an bore 405 extending inwardly from one end. A distal interior surface partially defining bore 405 is formed to include a threaded element 430.

Figure 4C:
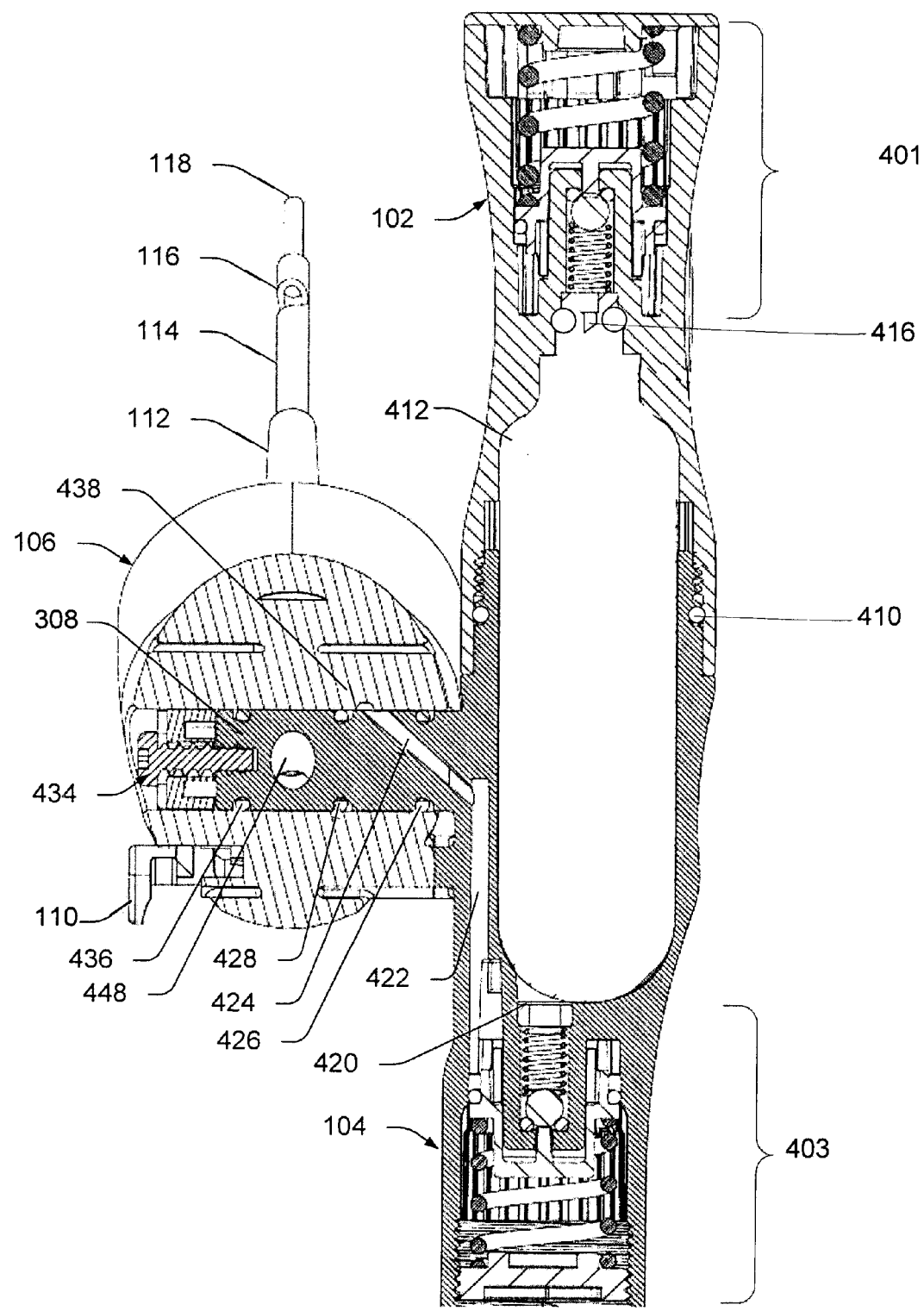
FIG. 4C shows the sub-assembly of FIG. 4A releasably attached to the upper handle portion of FIG. 4B.

FIG. 4C illustrates upper handle portion 102 releasably interconnected to lower handle portion 104, wherein threaded element 430 is intermeshed with threaded portion 406. O-ring 410 creates a pressure seal between the upper and lower handle assemblies, 102 and 104. Bore 405 in combination with bore 408 define an enclosed space 412.

Figure 4D:
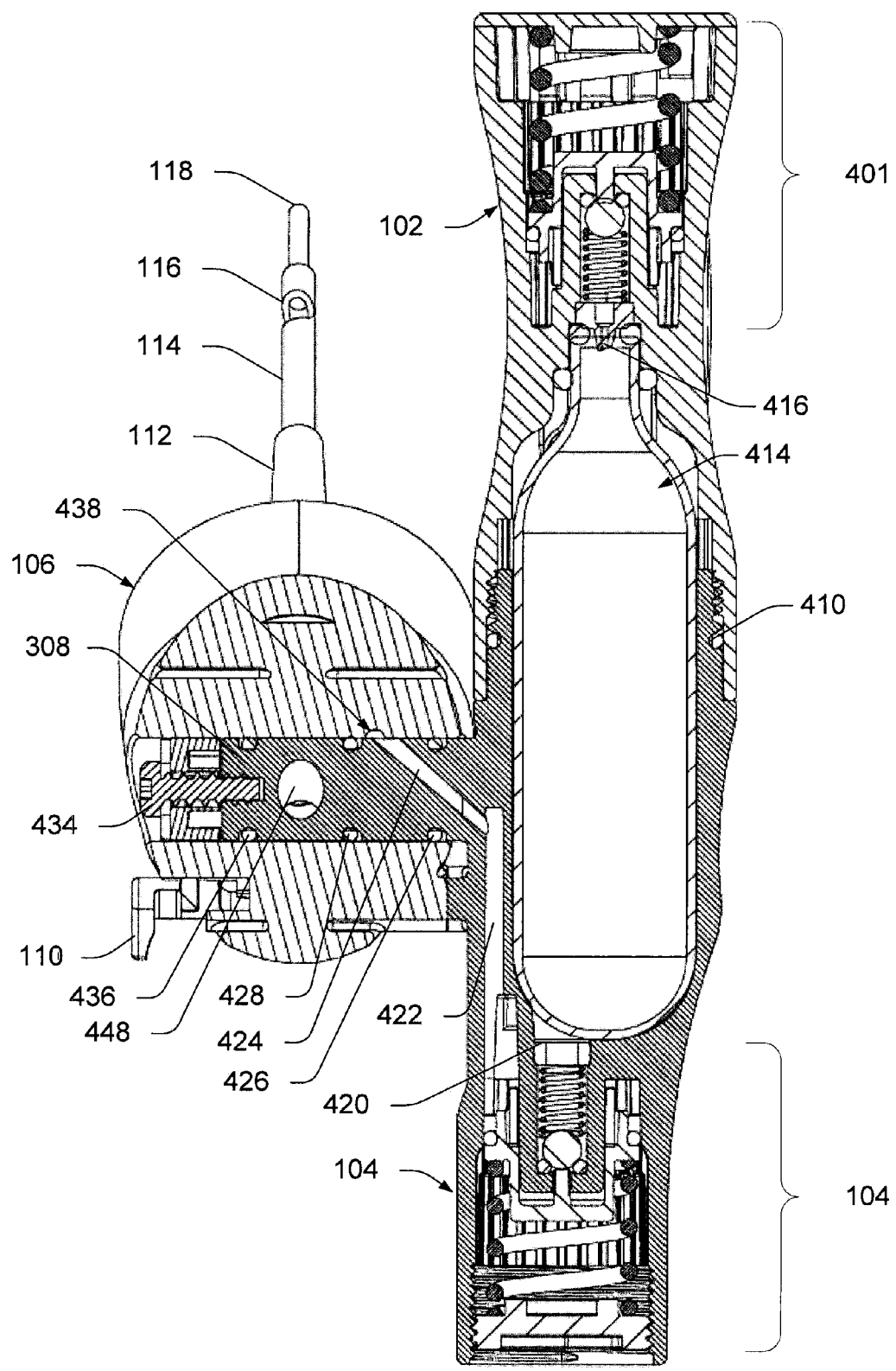
FIG. 4D shows a disposable high pressure gas cartridge disposed in the apparatus of FIG. 4C.

In the illustrated embodiment of FIG. 4D, high pressure gas cartridge 414 is disposed in enclosed space 412. In one embodiment, the high pressure gas cartridge 414 contains liquid carbon dioxide with a vapor pressure of approximately 850 psi at room temperature.

The upper handle portion 102 contains a first stage pressure regulator 401 and a lance 416 for piercing the high pressure gas cylinder 414. As the upper and lower housing assemblies, 102 and 104, are screwed together, lance 416 is forced into the flat portion on the tapered tip of the high pressure gas cartridge 414, thereby releasing the high pressure gas into the inlet of the first stage pressure regulator 401.

Referring to FIGS. 1B, 1C, and 4D, high pressure gas cartridge 414 is maintained in an "upright" orientation when handle assembly 101 is positioned in either the "closed" configuration of FIG. 1B or in the "open" configuration of FIG. 1C.

The high pressure gas cartridge 414 is positioned with the tapered tip facing upward in the handle assembly 101, as is depicted in FIGS. 1A-1C. The relative position of the handle assembly 101 while in the closed configuration is depicted in FIGS. 1A and 1B, while the relative position of the handle assembly 101 in the open position is depicted in FIG. 1C. Once the lance 416 pierces the flat portion on the tapered tip of the high pressure gas cartridge 414 and the beverage dispenser 100, beverage container 120, and beverage 125 are positioned for use, as depicted in FIGS. 1B and 1C, the high pressure gas cartridge 414, within the handle assembly 101, is maintained in a substantially upright position at all times during use. This position ensures that the lance 416 is exposed to the gaseous portion of the compressed gas within the high pressure gas cartridge 414 while the liquid portion of the compressed gas is held by gravity at the bottom of the high pressure gas cartridge 414 and away from the lance 416. The liquid portion of the compressed gas is, therefore, prevented from entering the first stage regulator 401, flowing through the rest of the apparatus, and damaging the various internal components of the beverage dispenser 100.

The first stage pressure regulator 401 reduces the gas from the vapor pressure of the liquid to an intermediate pressure. In one embodiment, the first stage pressure regulator 401 reduces the pressure of the gas from about 850 psi at its inlet to an intermediate pressure of about 35 psi at its outlet.

The first stage pressure regulator 401 releases intermediate pressure gas into the enclosed space 412. Disposal pressurized gas cartridge 414 can be disposed in enclosed space 412, but does not occupy the entirety of that enclosed space 412. The intermediate pressure gas travels through enclosed space 412 and around high pressure gas cartridge 414.

Gas inlet 420 to the second stage pressure regulator 403 is disposed within lower handle portion 104 a bottom portion of high pressure gas cartridge 414. Gas at an intermediate pressure enters the inlet 420 of the second stage pressure regulator 403. The second stage pressure regulator 403 reduces the gas pressure from the intermediate pressure to a pressure substantially equal to an equilibrium pressure of the gas in the beverage 125. By "substantially equal to," Applicant means equal to plus or minus ten percent.

Carbonated beverages, such as beer, cider, and soda, each comprise a nominal $CO_2$ pressure level to optimize taste and the serving/consuming experiences. Over-pressurization, as a result of excessive pressure in the head space 126 of beverage container 120, results in foam production and frothing during dispensing. Conversely, under-pressurization results in a flat-testing beverage. The nominal $CO_2$ pressure level, in combination with an efficient dispensing apparatus, results in the most pleasurable taste experience. Those skilled in the art will appreciate that each beverage has an optimal $CO_2$ pressure, and that pressure may vary on individual preferences. As a result, the second stage pressure regulator 403 can be adjusted to provide a $CO_2$ headspace pressure from a range of headspace pressure options, thereby allowing Applicant's apparatus 100 to be used to optimally serve a variety of beverages. In one embodiment, the second stage pressure regulator 403 can be adjusted to provide a $CO_2$ headspace pressure between 8 to 18 psi with an accuracy of +/−2 psi.

In one embodiment, the beverage container 120 contains a carbonated beverage 125 with an equilibrium $CO_2$ pressure of about 12 psi. In these embodiments, the pressure at the outlet of the second stage pressure regulator 403 is set to about 12 psi. In another embodiment, the carbonated beverage 125 comprises an equilibrium $CO_2$ pressure of about 14 psi, and the pressure at the outlet of the second stage pressure regulator 403 is therefore set to about 14 psi.

The lower handle portion 104 includes a stem 308. A spout assembly 106 is rotationally attached to the stem 308 of the lower handle portion 104. A screw 434 secures the sprout assembly 106 to the stem 308, while allowing rotational movement. O-rings 426, 428, and 436 create two separate regions about the stem 308, one between 426 and 428 and a second between 428 and 436. Each region is sealed from the other by the respective O-ring.

The gas exiting the outlet of the second stage pressure regulator 403 flows up a vertical channel 422, through an angled channel 424, and into the first region about the stem created by O-rings 426 and 428. The gas is confined along the stem 308 between the O-rings 426 and 428. The gas then flows into the spout assembly 106 through the stem gas channel 508 (shown on FIG. 5). The gas flows through the spout assembly 106, through the check valve 522 (shown on FIG. 4) embedded in the spout assembly 106, and into the beverage container 120 (shown on FIGS. 1B and 1C).

When the beverage dispenser 400 is in the "open" position (i.e., the handle assembly 101 is rotationally positioned to align the spout channel 332 (shown in FIG. 3) of the spout assembly 106 with the dispensing channel 448 of the stem 308, the pressure of the gas in the headspace of the beverage container forces the contained beverage into the inlet port 116 of the tubular pickup member 114. The tubular pickup member 114 is held at the bottom of the beverage container by weight 118. The beverage is then forced through the diffuser 112 and through the dispensing channel 448 of the stem 308. The beverage is confined along the stem 308 between the O-rings 428 and 436. The beverage then flows out the output port 108 (shown on FIG. 3) of the spout assembly 106.

Figure 5:
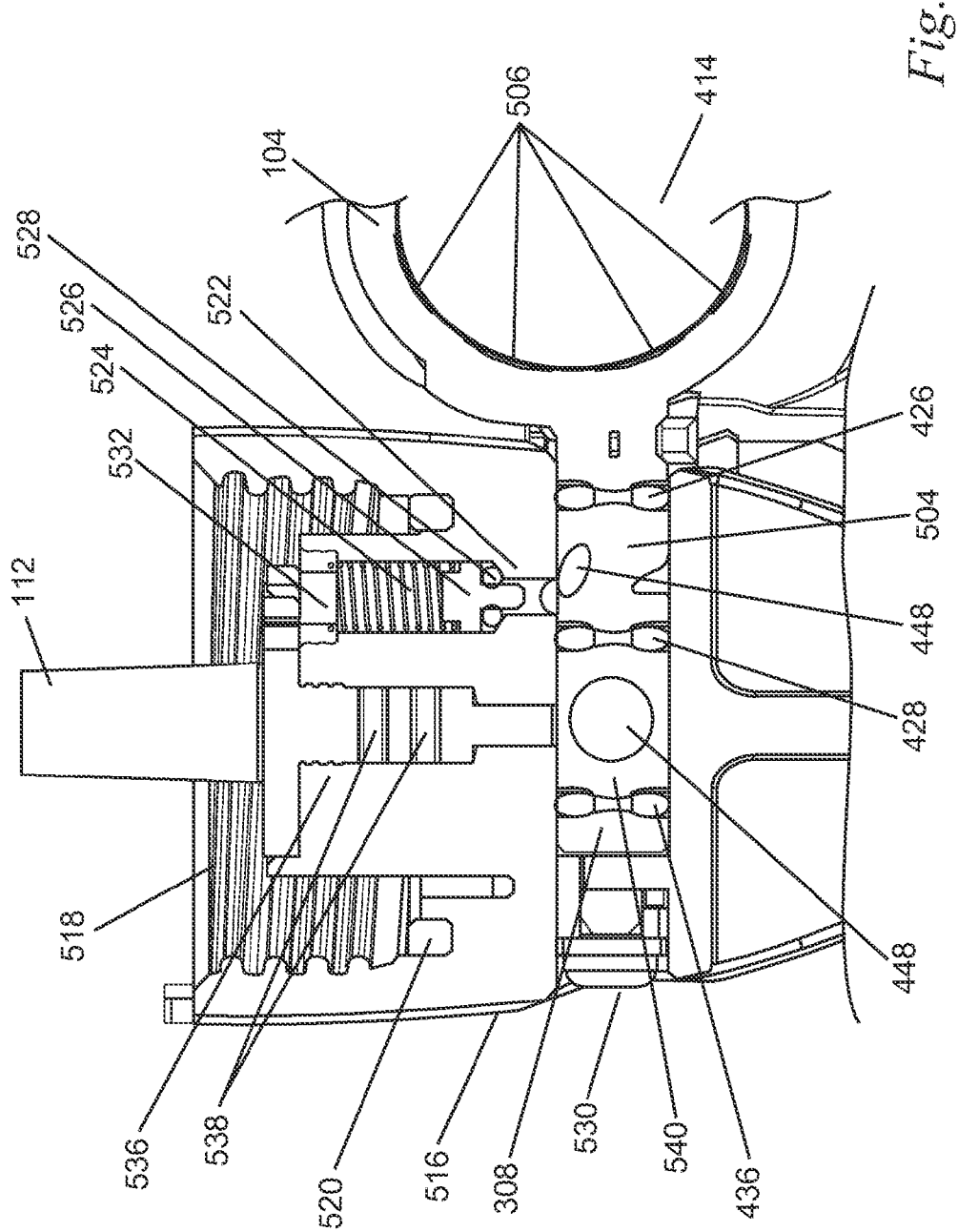
FIG. 5 is a cross sectional view of a portion of the beverage dispenser of FIG. 3 along 3B-3B.

Referring to FIG. 5, a cross sectional view of one embodiment of Applicant's beverage dispenser 500 is depicted. The cross section is taken along 3B-3B of FIG. 3.

A high pressure gas cartridge 414 is enclosed by a lower handle portion 104. Handle gas channels 506 channel the gas from the first stage regulator 401 around the high pressure gas cartridge 414 and to the second stage regulator 403. Pressurized gas travels from the second stage regulator 403 into stem region 504 formed by O-rings 426 and 428 through the stem gas channel 448.

A check valve 522 controls the flow of gas into the beverage container 120. As previously described, the stem gas channel 508 is in fluid communication with the outlet of the second stage regulator 403. The pressure of the gas in stem gas channel 508 is determined by the second stage regulator, which is set at about a nominal equilibrium $CO_2$ pressure of beverage 125 in the beverage container 120. When the pressure in the head space 126 is greater or equal to the pressure at the output of the second stage regulator 403, the check valve spring 524 forces the check valve plug 526 against the check valve O-ring 528. As the beverage in the beverage container is dispensed, the pressure in head space 126 decreases. The pressure at the output of the second stage regulator, now at a relatively higher pressure, overcomes the check valve spring 524, pushes the check valve plug 526 away from the check valve O-ring 528, thereby releasing gas through the check valve port 532 into the beverage container 120 and restoring the pressure in head space 126 to the pressure at the outlet of the second stage regulator 403. The check valve will not open if the pressure in the beverage container is at a greater or equal pressure as the pressure at the output of the second stage regulator, thereby preventing any backflow of gas or liquid into the second stage pressure regulator.

A diffuser tube 112 is frictionally attached to the spout assembly 106. A series of bumps 536 on the neck of the diffuser tube 112 secures the diffuser tube 112 to the spout assembly 516 by friction and without the need for glue, threading, or a separate fastening device. Two O-rings are disposed in O-ring grooves 538. The O-rings create a liquid and pressure seal between the diffuser tube 112 and spout assembly 516.

The stem channel 448, when aligned with diffuser tube 112, allows the beverage 125 to flow from the beverage container 120. Beverage 125 is confined within stem region 540 between the O-rings 428 and 436.

Figure 6:
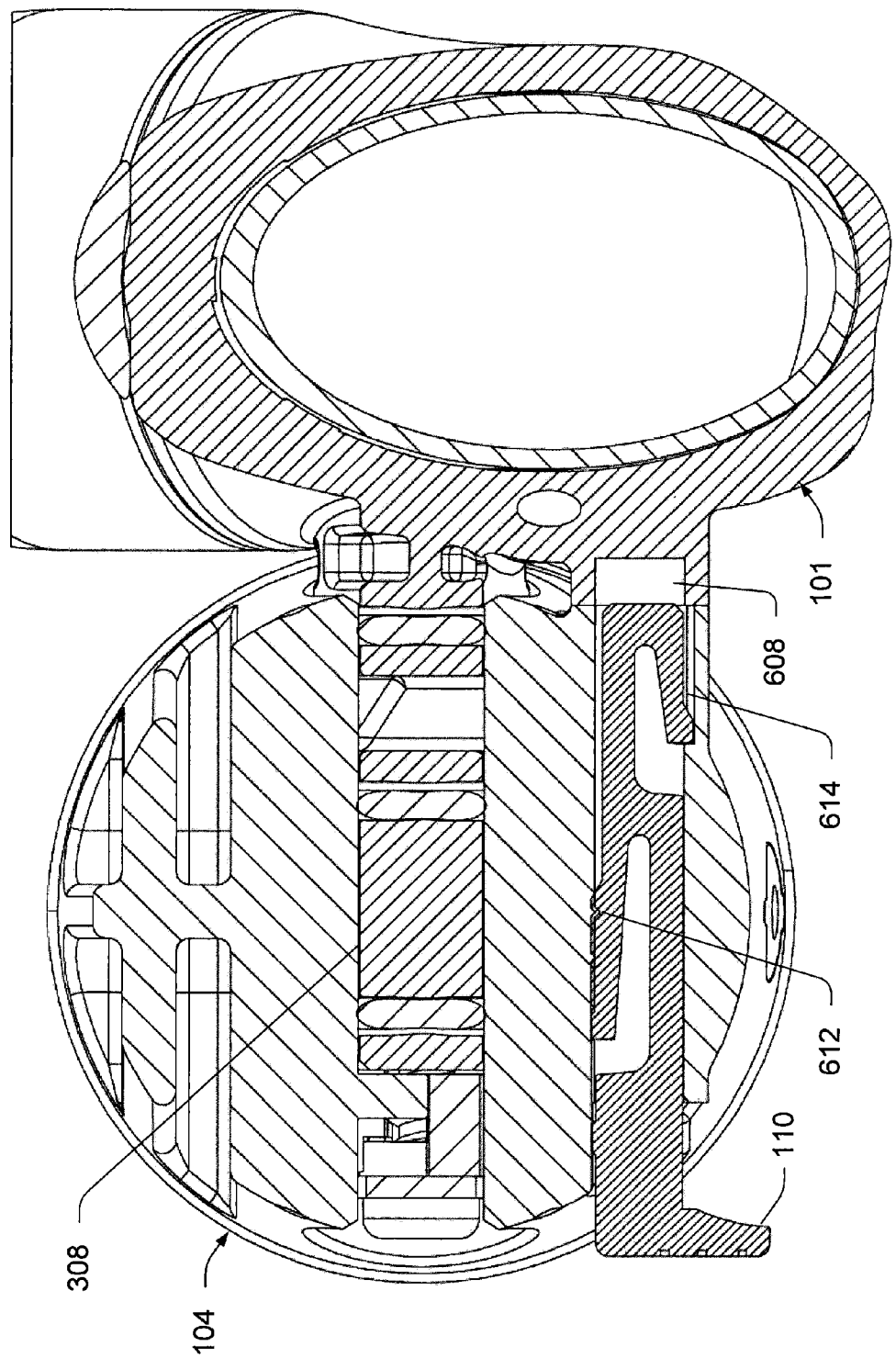
FIG. 6 is a cross sectional view of the beverage dispenser of FIG. 3 along 3C-3C.

Referring to FIG. 6, a cross sectional view of one embodiment of Applicant's beverage dispenser 600 is depicted. The cross section is taken along 3C-3C of FIG. 3.

The spout assembly 104 is rotationally attached to the handle assembly 101 by the stem 308. When the rotational position of the handle assembly 101 is in the "closed" position relative to the spout assembly 104, the lock notch 608 is in alignment with the safety lock 110. In this position, the safety lock 110 can be pushed in towards the handle assembly 101 and into the lock notch 608. The lock bump 612 holds the safety lock 110 in either the locked or unlocked position. The lock groove 614 prevents the safety lock from sliding out of the spout assembly 104.

Figure 7:
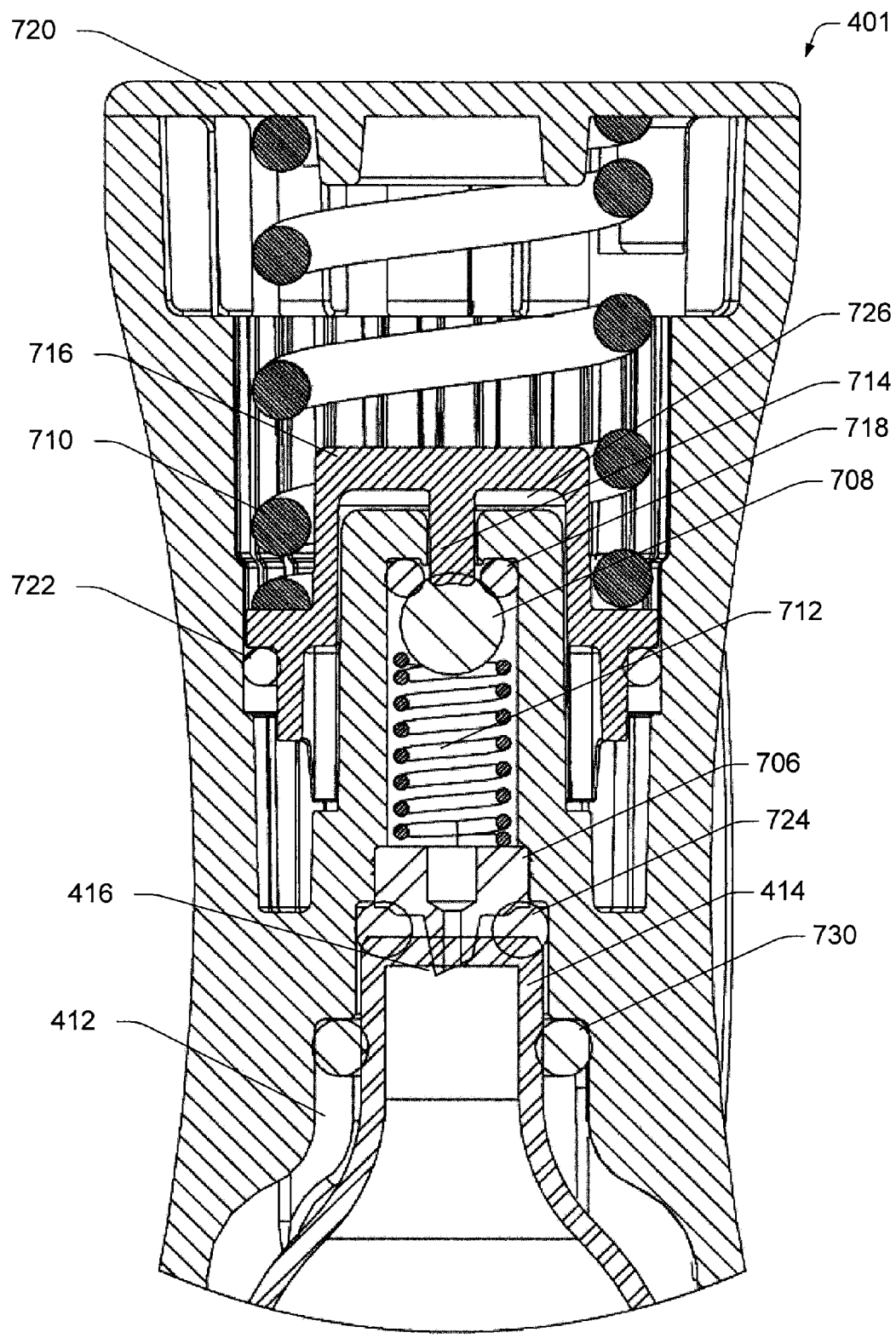
FIG. 7 is a block diagram illustrating the elements of Applicant's first stage pressure regulator.

Referring to FIG. 7, first stage pressure regulator 401 reduces the gas pressure from an initial pressure to an intermediate pressure. In one embodiment, the initial pressure at the input of the first stage pressure regulator is about 850 psi and the intermediate pressure is about 35 psi. In one embodiment, the initial pressure at the input of the first stage pressure regulator is about 525 psi and the intermediate pressure is about 35 psi.

The first stage pressure regulator 401 includes a regulator spring 710 that is secured in place with a cap 720. The regulator spring 710 exerts a force on a carriage 716. The carriage 716 can move vertically within the first stage pressure regulator 401. The intermediate pressure is determined by the force exerted by spring 710 on the carriage 716. In FIG. 7, the carriage 716 is shown at a fully-raised position. O-ring 722 creates a pressure seal to separate the portion of the first stage pressure regulator 401 under intermediate pressure from the portion exposed to external ambient pressure.

The carriage 716 has a pin 714. When the outlet pressure is lower than the desired intermediate pressure, the pin 714 pushes a ball 708 down and off an O-ring 718. When in contact with the ball, the O-ring 718 creates a pressure seal between the initial upstream pressure and the intermediate downstream pressure. The ball 708 is held against the pin 714 or the O-ring 718, as the case may be, by a spring 712.

A lance 416 punctures the top of the high pressure gas cylinder 414, releasing pressurized gas through the inlet of the first stage pressure regulator 706 and into the space occupied by the ball 708 and the spring 712. O-ring 724 creates a pressure seal between the input to the first stage pressure regulator 401 and the high pressure gas cylinder 704.

When the outlet pressure is below the intermediate pressure, high pressure gas flows up past the ball 708, initially not in contact with the O-ring 718, and into the sensing cavity 726. As pressure builds in the sensing cavity 726, pressure is exerted against the carriage 716, compressing spring 710. As the pressure in the sensing cavity approaches the intermediate pressure, the pressure exerted on carriage 716 is sufficient to compress the regulator spring 710 by the amount to raise the pin 714 so the ball 708 contacts O-ring 718, thereby stopping the flow of pressurized gas through the first stage regulation 700.

The sensing cavity 726 is in fluid communication with enclosed space 412 by a channel (not shown). An O-ring 730 creates a pressure seal to contain the intermediate pressure within the enclosed space 412.

Figure 8:
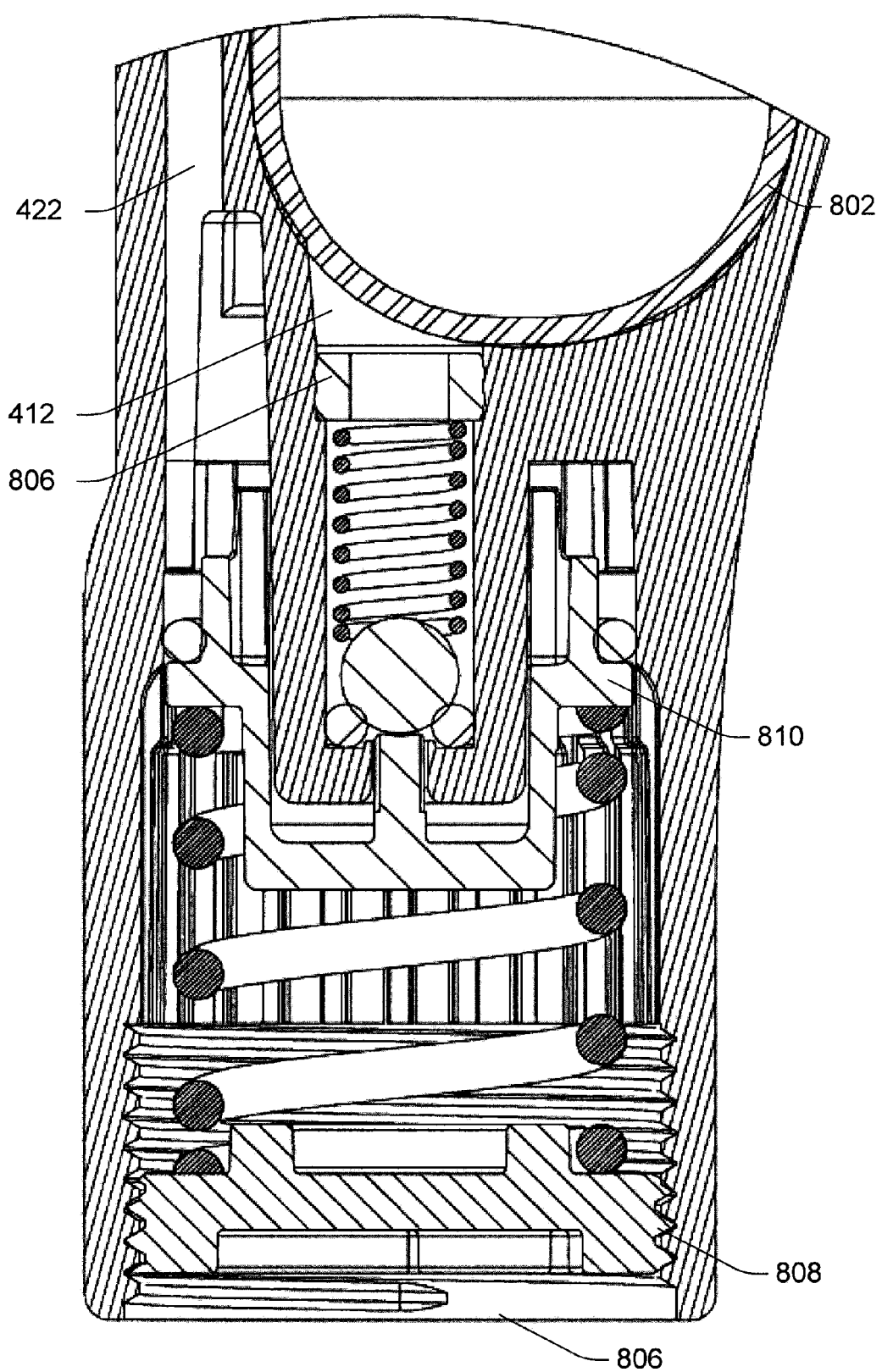
FIG. 8 is a block diagram illustrating the elements of Applicant's second stage pressure regulator.

Referring to FIG. 8, second stage pressure regulator 403 reduces gas pressure from an intermediate pressure to a final pressure. In one embodiment, the intermediate pressure at the input of the second stage pressure regulator is about 35 psi and the final pressure is about 12 psi.

Cap 806 is secured by a threaded connector 808. The threaded connector 808 allows the cap to be raised or lowered relative to the body of the second stage pressure regulator 403, thereby increasing or decreasing the pressure exerted by spring 812 on the carriage 810. This allows adjustment of the final pressure at the output of the second stage pressure regulator 403. In contrast and referring to FIG. 7, cap 720 is fixed so the pressure exerted by the spring 710 cannot be adjusted. In one embodiment, the second stage pressure regulator 403 can be adjusted to set the final pressure between 8 psi to 18 psi with an accuracy of +/−2 psi. In another embodiment, both the first stage pressure regulator 401 and the second stage pressure regulator 403 can be adjusted to determine the final pressure.

Referring to FIGS. 9(a) and (b), a curved O-ring 318 is depicted. FIG. 9(a) depicts two different perspectives of a diffuser tube 112. The O-ring 318 is disposed in, and conforms to, the shape of a channel 902 at the end of diffuser tube 112. The O-ring 318 is held in place by outer lip 906 and inner lip 908. The O-ring 318 conforms to the end of diffuser tube 112, which is the shape of a hyperbolic paraboloid. Referring back again to FIG. 3, the shape of the O-ring can also be seen as 318 and the shape of stem 308 can be seen as cylindrical. The O-ring 318 conforms to the surface of the stem 308 and is held in place against the stem 308 by outer lip 906 and inner lip 908. This allows the stem 308 to rotate within the spout assembly 106, while maintaining the liquid and pressure seal provided by O-ring 318. FIG. 9(b) depicts two additional views of the O-ring 318 conforming to the shape of a hyperbolic paraboloid. The curved O-ring 318 has a radius of curvature R1 904.

In different embodiments, the combination of a hyperbolic paraboloid O-ring (similar to 318), a tubular stem (similar to 308), and a tube (similar to 112) can be used in place of a traditional ball valve and can be used to control the flow of gas, liquids, or a mixture of both gas and liquids.

Referring to FIGS. 10(a) and (b), two cross sections of Applicant's beverage dispenser are shown in the open and closed position. The cross sections are taken along 2-2 of FIG. 2. In FIG. 10(a), Applicant's beverage dispenser is shown in the "closed" (i.e., off) position. The stem 308 is fixed to lower handle portion 104. The stem 308 has a radius R2 1020. The radius of curvature R1 904 of the curved O-ring 318, shown in FIG. 9, is equal to the radius R2 1020. As such, the curved O-ring 318 conforms to the radius of stem 308 when placed in contact with the stem 308, thereby creating a pressure and liquid seal between the stem and the diffuser tube 112.

When handle assembly 101 is disposed in the closed position of FIG. 10(a), the stem channel 448 is out of alignment with diffuser tube 112 and spout channel 332, thereby preventing the beverage from flowing through the diffuser tube 112 and to the output port 108.

When handle assembly 101 is disposed in the open position of FIG. 10(b), stem channel 448 is in alignment with diffuser tube 112 and spout channel 1016, thereby allowing the beverage to flow through the diffuser tube 112 and to the output port 108.

Figure 11:
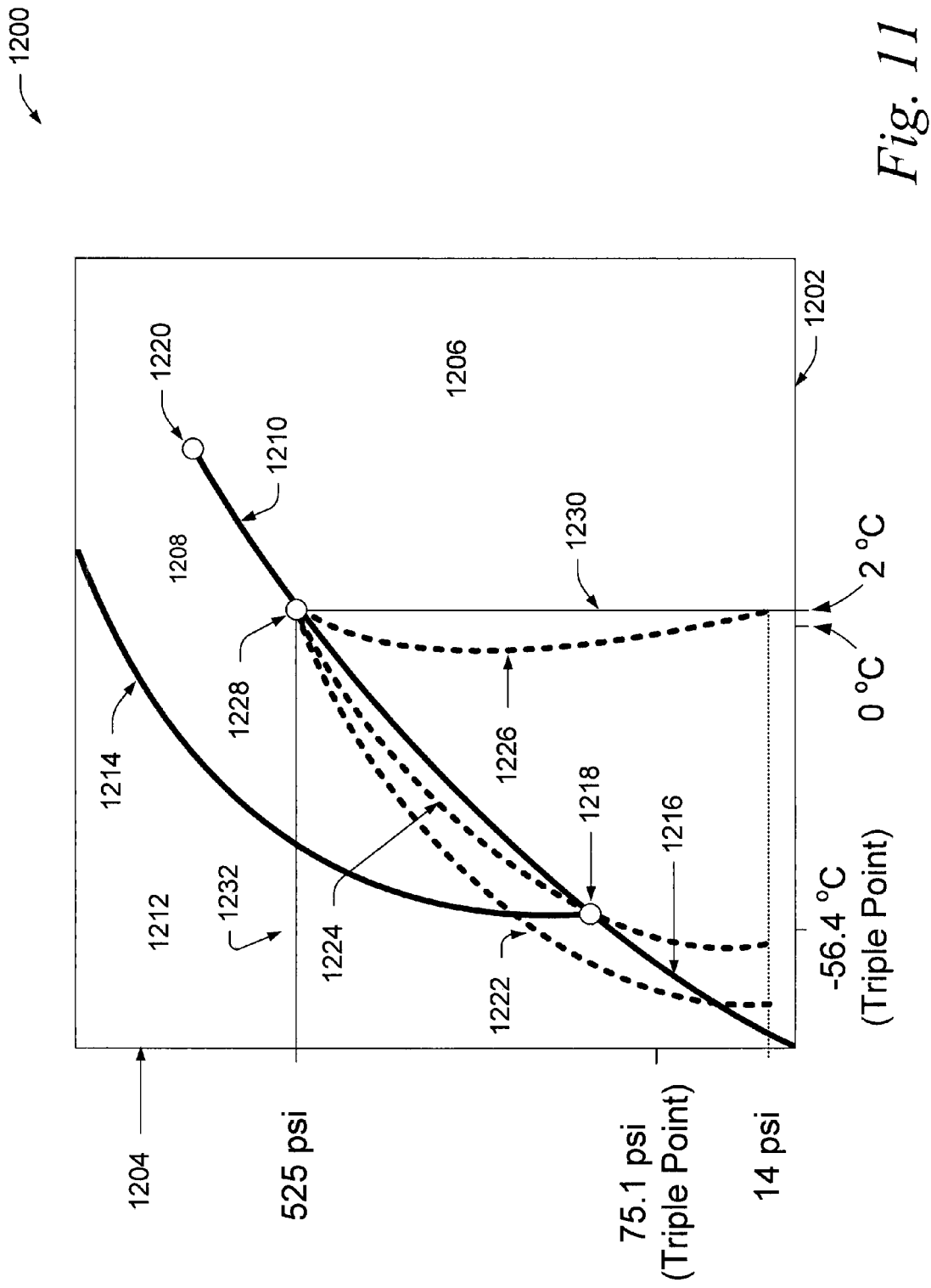
FIG. 11 a temperature-pressure phase diagram for carbon dioxide is depicted to illustrate the behavior of $CO_2$ gas under various pressure and temperature conditions.

Referring to FIG. 11, a $CO_2$ pressure-temperature phase diagram 1200 is presented to illustrate the behavior of the gas after being released from the first stage regulator. The x-axis 1202 represents temperature and the y-axis 1204 represents pressure. $CO_2$ is a gas in area 1206, a liquid in area 1208, and a solid in area 1212. $CO_2$ along the liquid-gas phase boundary 1210 will exist in both liquid and gas states at equilibrium. $CO_2$ along the solid-liquid phase boundary 1214 will exist in both solid and liquid states at equilibrium. $CO_2$ along the solid-gas boundary 1216 will exist in both solid and gas states at equilibrium. $CO_2$ at the triple point 1218 will exist in all three states at equilibrium (solid, liquid, and gas). The critical point 1220 marks the point which the $CO_2$ exists as a supercritical fluid.

As gas is released from the high pressure gas cartridge 414 in FIG. 4D and through the first stage pressure regulator 401, the gas undergoes a significant drop in pressure. In one embodiment, the beverage dispenser 100 is operated at room temperature (about 25° C.) wherein the gas in the high pressure gas cartridge 414 is at approximately 850 psi. In another embodiment, the beverage dispenser 100 is operated at chilled temperatures, such as those within a refrigerator (about 2° C.), wherein the gas in the high pressure gas cartridge 414 is at about 525 psi.

The gas from the high pressure gas cartridge 414 is released through the first stage pressure regulator 401, which reduces the pressure of the gas to about 35 psi. As the gas expands, its temperature drops. It is important that the $CO_2$ remain in a gaseous state as it is released from the first stage pressure regulator 401 and as it flows through beverage dispenser 100. Liquid or solid state $CO_2$ may damage the downstream components and/or interfere with the proper functioning of the beverage dispenser 100. The behavior of the expanding gas can be represented on the $CO_2$ phase diagram 1200.

In an adiabatic system, no heat is transferred to or from the gas during expansion. As such, the gas undergoes both a drop in pressure and temperature. While no process is purely adiabatic, as some level of heat transfer will always occur, some systems approach that of an adiabatic system. For example, gas that expands so rapidly, that no heat transfer can occur approaches that of an adiabatic system as does gas expanding in an environment where there is insufficient heat available for the gas to absorb.

In an isothermal system, the temperature of the gas stays constant. As the gas in an isothermal system expands, the gas absorbs heat from the environment to maintain a constant temperature. As such, an isothermal system for an expanding gas requires a net transfer of heat into the system.

The gas released from the first stage pressure regulator 401 will more resemble that of an adiabatic system if there is insufficient heat available for the gas to absorb causing the temperature of the gas to drop and potentially causing all or a portion of the gas to change state. The curves 1222 and 1224 display adiabatic properties. Conversely, gas released from the first stage pressure regulator 401 will more resemble that of an isothermal system if there is sufficient heat available for the gas to absorb causing the temperature of the gas to remain somewhat constant. The curve 1226 displays isothermal properties.

Point 1228 represents gas in the high pressure gas cartridge 414 at 2° C. as represented by vertical line 1230. This scenario would result when the beverage dispenser 100, beverage container 120, and beverage 125 are disposed within a refrigerator, as refrigerators are commonly maintained at about 2° C.

The pressure in the high pressure gas cartridge 414 at 2° C. is approximately 525° C. as shown by line 1232. Curve 1222 is an example representation of the behavior of gas released at a pressure of 525 psi and reduced to 14 psi. Starting at point 1228 on the liquid-gas phase boundary 1210, where the $CO_2$ exists in both a liquid and gas state, the curve 1222 travels downward and to the left within the liquid area 1208. At this point, the $CO_2$ remains in liquid form. The curve then passes over the solid-liquid phase boundary 1214 and enters the solid area 1212. At this point, the $CO_2$ begins to crystallize. The curve then passes across the solid-gas boundary 1216 and into the gas area 1206.

Curve 1224 follows a similar path as curve 1222 except that it passes through the triple point 1218. At this point, all three states exist (solid, liquid, and gas) simultaneously. The undesirable liquid and solid state could damage a beverage dispenser or cause it to malfunction. It is therefore desirable to keep the $CO_2$ in the gas state and avoid formation of the solid and liquid states. Curves 1222 and 1224 are not representations of a purely adiabatic system, but they do display adiabatic properties.

Curve 1226 represents a desirable phase path for the $CO_2$ gas. While not purely isothermal, because of the small drop in temperature, it does display isothermal properties. Starting at point 1228, the curve travels downward with only a slight dip in temperature. As more heat is absorbed from the surroundings, the temperature returns to the starting point of 2° C. No phase transfers occurred along this curve and the $CO_2$ remained in the gas state during the entire pressure drop.

To induce isothermal-like properties rather than adiabatic-like properties, the gas released from the first stage pressure regulator 401 travels along the length of the high pressure gas cartridge 414 in the gas channels 506. The wide, shallow gas channels 506 force a significant portion of the gas to contact the surface of the high pressure gas cartridge 414. In one embodiment, the high pressure gas cartridge 414 is metal, which provides excellent heat transfer properties. For example, steel has a specific heat capacity ($c_p$) of 0.49 J/g*K. Therefore, for a high pressure gas cartridge constructed from 100 g of steel, the expanding gas must absorb nearly 1 kJ of energy from the cartridge to lower the temperature of the cartridge by 20 K. As such, the high pressure gas cartridge 414 functions as a thermal capacitor, absorbing heat from the ambient environment and making the heat readily available to the expanding gas. By avoiding an excessive temperature drop, the expanding gas more resembles an isothermal process (similar to curve 1226) and is prevented from entering the solid or liquid states. The avoidance of a phase change protects the internal components and avoids interruptions in operation of the beverage dispenser 100.

In normal usage, the amount of gas continuously flowing through the gas channels 506 will be relatively small and result in only a small temperature drop in the high pressure gas cartridge 414 (i.e., the thermal capacitor is only somewhat depleted). Once the gas flow stops, the high pressure gas cartridge 414 re-equilibrates with the ambient temperature (i.e., the thermal capacitor recharges).

FIG. 12 summarizes one embodiment of using Applicant's beverage dispenser. In step 1102 the method provides a beverage disposed in a reservoir, a high pressure gas source, and a beverage dispenser are provided at step 1102. The beverage may be any carbonated or non-carbonated liquid. In certain embodiments, the beverage comprises a carbonated beverage, such as beer, cider, or soda. In other embodiments, the beverage comprises a non-carbonated beverage, such as water, or juice. In one embodiment, the beverage is beer.

The high pressure gas source can be any gas, such as nitrogen or carbon dioxide, which is under pressure and stored in a suitable cartridge. In one embodiment, the high pressure gas source is a threadless, disposable carbon dioxide ($CO_2$) cartridge containing $CO_2$. In one embodiment, the high pressure gas source is a threaded, disposable $CO_2$ cartridge containing $CO_2$.

In embodiments wherein liquefied gas remains within the cartridge, the pressure of the gas is constant and is a function of temperature. In these embodiments, the pressure within the high pressure gas cartridge remains constant at a given temperature. As the last amount of the liquefied gas evaporates, the pressure provided by the high pressure gas cartridge decreases In one embodiment, the pressure provided by the high pressure gas cartridge is about 850 psi at room temperature.

In step 1104, the method selects a final pressure. In certain embodiments, the final pressure comprises an equilibrium pressure in a head space of the container of step 1102 when partially filled with a carbonated beverage of step 1102. In certain embodiments, when the carbonated beverage of step 1102 is beer, the final pressure selected in step 1104 is between about 8 psi to about 18 psi. In certain embodiments, the final pressure selected in step 1104 is about 14 psi.

The beverage dispenser of step 1102 comprises two pressure regulators, wherein the output pressure of the first regulator is fixed, and wherein the output pressure of the second regulator is adjustable. In step 1106, the method adjusts the second regulator to provide an output pressure equal to the final pressure selected in step 1104. In certain embodiments, the position of end cap 806 is adjusted thereby adjusting the force spring 812 exerts on carriage 810.

In step 1108, the beverage dispenser of step 1102 is releasably attached to the reservoir of step 1102. In one embodiment, the beverage dispenser includes a pickup tube that extends under the surface of the contained beverage in the reservoir to guide the beverage through the body of the beverage dispenser. In one embodiment, a pressure and liquid seal is formed between the beverage dispenser and the reservoir to maintain the pressure in the reservoir. In one embodiment, the seal is formed by an O-ring.

In step 1110, a high pressure gas cartridge 414 is inserted into bore 408 of lower handle portion 104, and upper handle portion 102 is threadedly connected with lower handle portion 104 thereby driving lance member 416 into and through a top portion of cartridge 414 thereby releasing the contained gas at the gas source pressure within space 412.

In step 1112, the released gas comprising a source pressure passes through a first pressure regulator, such as first stage pressure regulator 401. The first stage pressure regulator reduces the pressure of the gas from the source pressure to an intermediate pressure. In one embodiment, that gas is at room temperature (about 77° F.) and has a source gas pressure of about 850 psi. In one embodiment, that gas is at refrigerator temperature (about 36° F.) and has a source gas pressure of about 525 psi. In either embodiment, the first stage pressure regulator reduces the source gas pressure to an intermediate pressure of 35 psi.

In step 114 the intermediate pressure gas is directed over the gas cartridge. As described hereinabove, the has cartridge functions as a thermal capacitor to warm the cooled intermediate pressure gas and prevent formation of either liquid or solid carbon dioxide particles from forming.

In step 116, the intermediate pressure gas passes through a second stage pressure regulator disposed in the handle assembly, such as second stage pressure regulator 403. The second stage pressure regulator reduces the pressure of the gas from the intermediate pressure to the final pressure selected in step 1106.

In step 1118, the gas, now at the final pressure, is directed into the reservoir. In one embodiment. In step 1120, Applicant's dispenser determines if the gas pressure within the reservoir is less than the final pressure. In certain embodiments, step 1120 is performed by a check valve, such as check valve 522. The check valve allows final pressure gas to flow into the reservoir when the pressure in the headspace 126 of the reservoir 120 is less than the final pressure selected in step 1104.

The various steps or acts in a method or process may be performed in the order shown, or may be performed in another order. For example, in certain implementations, individual steps recited in FIG. 12 may be eliminated or reordered.

Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods to implement the present invention. It is understood that the examples and implementations described herein are for illustrative purposes only and that various modifications or changes in light thereof will be suggested to persons skilled in the art and are to be included within the spirit and purview of this application.

While the preferred embodiments of the present invention have been illustrated in detail, it should be apparent that modifications and adaptations to those embodiments may occur to one skilled in the art without departing from the scope of the present invention as set forth in the following claims.

I claim:

1. A portable beverage dispensing apparatus, comprising a spout assembly and a handle assembly pivotally attached to said spout assembly, said handle assembly comprising;
   an upper handle portion formed to include a first bore extending inwardly;
   a lower handle portion formed to include a second bore extending inwardly;
   wherein said upper handle portion is releasably attached to said lower handle portion such that said first bore and said second bore define an enclosed space;
   wherein said first bore is dimensioned such that a compressed gas cartridge disposed within said enclosed space is in physical contact with a side wall surface defining said first bore such that said compressed gas cartridge can absorb heat from an ambient environment;
   wherein said second bore is dimensioned such that a compressed gas cartridge disposed within said enclosed space is in physical contact with a side wall surface defining said second bore such that said compressed gas cartridge can absorb heat from an ambient environment;
   a first stage pressure regulator disposed in said upper handle portion above said enclosed space; and
   a second storage pressure regulator disposed in said lower handle portion below said enclosed space.

2. The portable beverage dispensing apparatus of claim 1, wherein:
   said first bore is formed to include a first plurality of axial grooves;
   said second bore is formed to include a second plurality of axial grooves;
   when said upper handle portion is attached to said lower handle portion, said first plurality of axial grooves are placed in fluid communication with said second plurality of axial grooves to form a plurality of gas channels within said enclosed space.

3. The portable beverage dispensing apparatus of claim 2, further comprising:
   a high pressure gas cartridge disposed within said enclosed space;
   wherein said plurality of gas channels surround said high pressure gas cartridge.

4. The portable dispensing apparatus of claim 1, wherein said spout comprises:
   a threaded connector for releaseable attachment to a beverage reservoir;
   a tubular diffuser member extending outwardly from said threaded connector;
   an output port in fluid communication with said tubular diffuser member.

5. The portable dispensing apparatus of claim 4, said lower handle further comprising:
   a cylindrical stem extending outwardly therefrom;
   wherein said spout assembly is rotationally attached to said cylindrical stem.

6. The portable dispensing apparatus of claim 5, wherein:
   said cylindrical stem is formed to include a dispensing channel extending therethrough;
   when said handle assembly is disposed in a first position said dispensing channel is in fluid communication with said tubular diffuser member and with said output port; and
   when said handle assembly is disposed in a second position said dispensing channel is not in fluid communication with either said tubular diffuser member or said output port.

7. The portable dispensing apparatus of claim 1, wherein an output pressure of said second stage pressure regulator is adjustable.

8. A method to dispense a beverage from a reservoir, comprising:
   providing a portable beverage dispensing apparatus, comprising a spout assembly, a handle assembly pivotally attached to said spout assembly said handle assembly comprising:
   an upper handle portion formed to include a first bore extending inwardly;
   a lower handle portion formed to include a second bore extending inwardly;
   wherein said upper handle portion is releasably attached to said lower handle portion such that said first bore and said second bore define an enclosed space;
   wherein said first bore is dimensioned such that a compressed gas cartridge disposed within said enclosed space is in physical contact with a side wall surface defining said first bore such that said compressed gas cartridge can absorb heat from an ambient environment;
   wherein said second bore is dimensioned such that a compressed gas cartridge disposed within said enclosed space is in physical contact with a side wall surface defining said second bore such that said compressed gas cartridge can absorb heat from an ambient environment;
   wherein said first stage pressure regulator is disposed in said upper handle portion above said enclosed space; and
   wherein said second storage pressure regulator is disposed in said lower handle portion below said enclosed space;
   attaching a reservoir containing a beverage to said portable beverage dispensing apparatus, wherein the beverage fills a portion of the reservoir, and wherein a head space within said reservoir comprises carbon dioxide at an equilibrium pressure;
   inserting a disposable high pressure carbon dioxide gas cartridge into said handle assembly;
   introducing carbon dioxide gas into said reservoir at said equilibrium pressure;
   displacing all or a portion of said beverage from said reservoir.

9. The method of claim 8, wherein:
   said disposable high pressure carbon dioxide gas cartridge comprises contained gas having a source gas pressure;

said source gas pressure is about 70 times said equilibrium pressure.

10. The portable beverage dispensing apparatus of claim 8, wherein:
   said first bore is formed to include a first plurality of axial grooves;
   said second bore is formed to include a second plurality of axial grooves;
   when said upper handle portion is attached to said lower handle portion, said first plurality of axial grooves are placed in fluid communication with said second plurality of axial grooves to form a plurality of gas channels within said enclosed space.

11. The portable beverage dispensing apparatus of claim 10, wherein said plurality of gas channels surround said high pressure gas cartridge.

12. The portable dispensing apparatus of claim 8, wherein said spout comprises:
   a threaded connector for releaseable attachment to a beverage reservoir;
   a tubular diffuser member extending outwardly from said threaded connector;
   an output port in fluid communication with said tubular diffuser member.

13. The portable dispensing apparatus of claim 12, said lower handle further comprising:
   a cylindrical stem extending outwardly therefrom;
   wherein said spout assembly is rotationally attached to said cylindrical stem.

14. The portable dispensing apparatus of claim 13, wherein:
   said cylindrical stem is formed to include a dispensing channel extending therethrough;
   when said handle assembly is disposed in a first position said dispensing channel is in fluid communication with said tubular diffuser member and with said output port; and
   when said handle assembly is disposed in a second position said dispensing channel is not in fluid communication with either said tubular diffuser member or said output port.

15. The portable dispensing apparatus of claim 8, wherein an output pressure of said second stage pressure regulator is adjustable.

* * * * *